(12) United States Patent
Bailey et al.

(10) Patent No.: US 11,990,671 B2
(45) Date of Patent: May 21, 2024

(54) DEPLOYABLE ELECTROMAGNETIC RADIATION DIRECTING SURFACE SYSTEM WITH ACTUATORS

(71) Applicant: M.M.A. Design, LLC, Louisville, CO (US)

(72) Inventors: Mark Alan Bailey, Longmont, CO (US); Mitchell Todd Wiens, Loveland, CO (US)

(73) Assignee: M.M.A. Design, LLC, Louisville, CO (US)

( * ) Notice: Subject to any disclaimer, the term of this patent is extended or adjusted under 35 U.S.C. 154(b) by 0 days.

(21) Appl. No.: 17/402,407

(22) Filed: Aug. 13, 2021

(65) Prior Publication Data

US 2022/0102847 A1   Mar. 31, 2022

Related U.S. Application Data

(60) Provisional application No. 63/065,617, filed on Aug. 14, 2020.

(51) Int. Cl.
*B64G 1/22* (2006.01)
*H01Q 1/28* (2006.01)
*H01Q 1/36* (2006.01)

(52) U.S. Cl.
CPC .............. *H01Q 1/288* (2013.01); *H01Q 1/36* (2013.01)

(58) Field of Classification Search
CPC ........ H01Q 15/02; H01Q 15/148; H01Q 1/28; H01Q 1/288; H01Q 19/06; H01Q 19/062; H01Q 19/10; H01Q 3/16; H01Q 3/20; H01Q 3/2694; H01Q 3/46; B64G 1/222; B64G 1/66; B64G 1/64
See application file for complete search history.

(56) References Cited

U.S. PATENT DOCUMENTS

| | | | | |
|---|---|---|---|---|
| 4,380,013 A | * | 4/1983 | Slysh | F24S 23/81 244/172.6 |
| 11,542,040 B1 | | 1/2023 | Hemmati | |
| 2017/0093046 A1 | | 3/2017 | Harvey et al. | |
| 2018/0023419 A1 | | 1/2018 | Nakayama | |
| 2018/0048059 A1 | * | 2/2018 | Greschik | H01Q 1/28 |
| 2018/0309208 A1 | * | 10/2018 | Cosner | B64G 1/66 |

(Continued)

OTHER PUBLICATIONS

"Non Final Office Action Issued in U.S. Appl. No. 17/402,414", dated Apr. 4, 2023, 18 Pages.

*Primary Examiner* — Thai Pham
(74) *Attorney, Agent, or Firm* — Holzer Patel Drennan

(57) ABSTRACT

A deployable electromagnetic radiation antenna system for extraterrestrial deployment of an electromagnetic radiation directing surface, the deployable electromagnetic radiation antenna system comprising is provided. The deployable electromagnetic radiation antenna system includes one or more deployable support structures, an electromagnetic radiation directing surface, a plurality of actuators, each coupled to one or more of the one or more deployable support structures and the electromagnetic radiation directing surface, and a satellite body, wherein the electromagnetic radiation directing surface is coupled to the satellite body by the one or more deployable support structures and the electromagnetic radiation directing surface is deployable from the satellite body by the one or more deployable support structures.

48 Claims, 10 Drawing Sheets

(56) References Cited

U.S. PATENT DOCUMENTS

| | | |
|---|---|---|
| 2019/0036213 A1 | 1/2019 | Russell et al. |
| 2019/0097300 A1* | 3/2019 | Palisoc .................. B64G 1/222 |
| 2019/0123813 A1 | 4/2019 | Mendelsohn |
| 2020/0231308 A1 | 7/2020 | Ruhl et al. |
| 2020/0411998 A1* | 12/2020 | Mast ...................... H01Q 21/20 |

* cited by examiner

DEPLOYABLE ELECTROMAGNETIC RADIATION DIRECTING SURFACE SYSTEM WITH ACTUATORS

CROSS-REFERENCE TO RELATED APPLICATIONS

The present application claims benefit for priority to U.S. Provisional Application No. 63/065,617, entitled "Deployable Global Radiofrequency Observatory System" and filed on Aug. 14, 2020, which is specifically incorporated by reference for all that discloses and teaches.

The present application is also related to U.S. application Ser. No. 17/402,414, entitled "Deployable Electromagnetic Radiation Directing Lens System" and filed on Aug. 13, 2021, which is specifically incorporated by reference for all that discloses and teaches.

BACKGROUND

Systems for changing the orientation of satellite structures can be cumbersome and difficult to control. This can be especially problematic in systems where the satellite structures are configured to rotate or spin. The moments generated can be considerable and imbalances can render the operation impractical. Also because satellites are transported out of the atmosphere with limited weight and volume specifications, actuating structures should be lightweight and compact.

SUMMARY

The described technology provides a deployable electromagnetic radiation antenna system. The deployable electromagnetic radiation antenna system includes one or more deployable support structures, an electromagnetic radiation directing surface, a plurality of actuators, each coupled to one or more of the one or more deployable support structures and the electromagnetic radiation directing surface, and a satellite body, wherein the electromagnetic radiation directing surface is coupled to the satellite body by the one or more deployable support structures and the electromagnetic radiation directing surface is deployable from the satellite body by the one or more deployable support structures.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
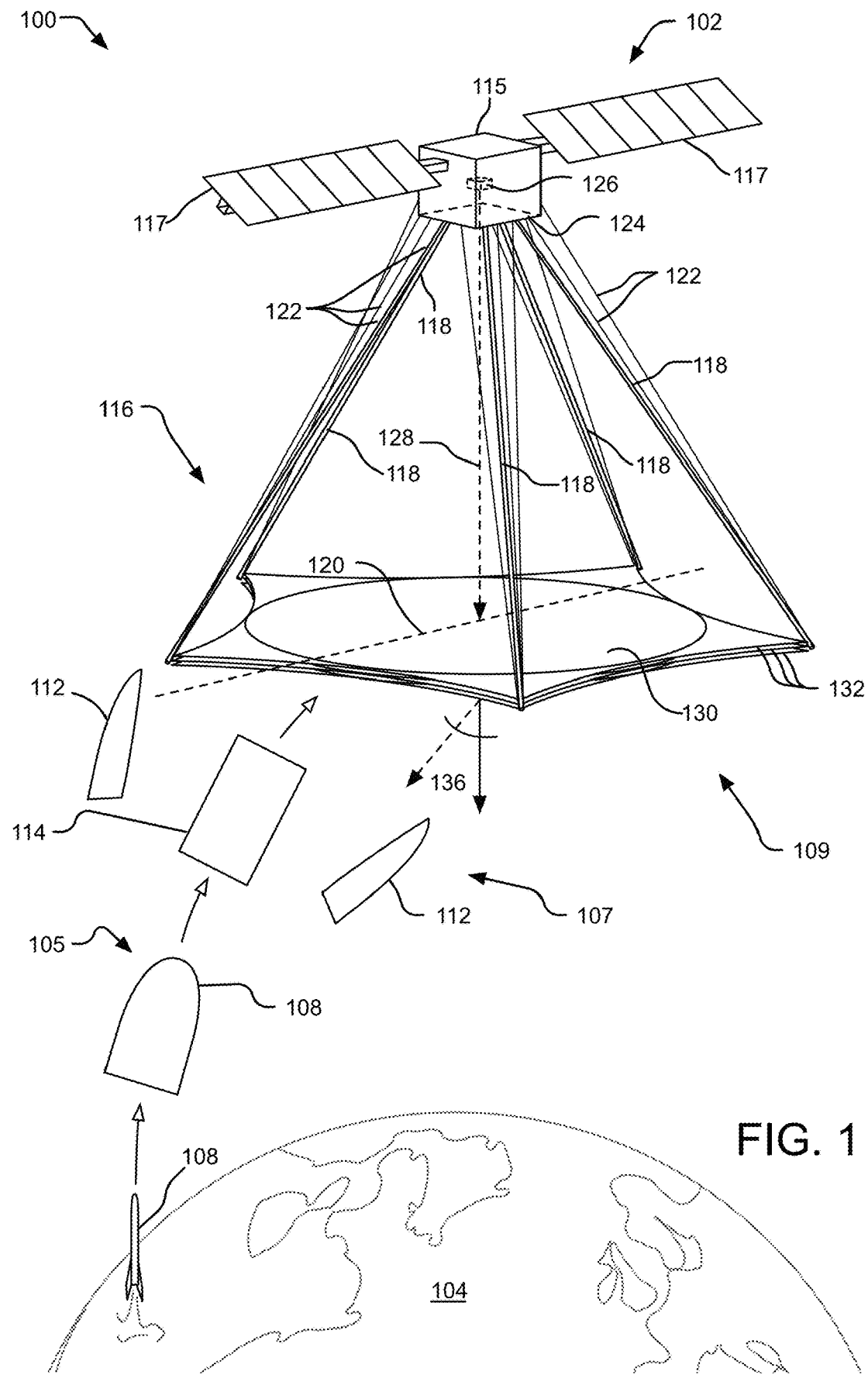
FIG. 1 illustrates an example environment for use in deploying an example deployable radiofrequency antenna system in multiple phases.

One approach to providing an extraterrestrial system that can perform measurements of a celestial object's surface (e.g., a planet surface) is to use a deployable surface including at least a portion adapted to radiofrequency energy (hereafter, EM Surface). An example of an EM Surface is a mesh antenna surface that serves as a reflector. A satellite is launched into orbit and positioned such that the satellite body is generally positioned between the reflector and a planet surface. For example, the reflector can be a spinning or rotating 6-meter diameter deployable mesh parabolic reflector deployed at a 35.5° angle on the end of a large and rigid EM Surface support mast. The reflector is angled/tilted and offset relative to the satellite body so that radiofrequency signals communicated to or from the antenna feed can be directed to the reflector and then redirected to the planet surface, substantially bypassing the satellite body. The reflector can also rotate relative to the planet surface to produce a sweeping pattern or swath on the planet surface. Typically, this device includes a heavy rigid trussing system to support the angled and offset reflector. This approach, however, presents positioning and balance issues when sweeping the signal on the planet surface. In addition, the mesh antenna and trussing system are heavy and expensive and do not compact to a small package volume when stowed before and during the system launch from the planet surface.

The improved technology described herein relates to a deployable radiofrequency antenna system for space applications. In one implementation, a deployable low-frequency antenna system, such as an antenna for a global L-band active/passive observatory for water cycle systems, can be used to support Earth science mission applications, e.g., to detect soil moisture using passive radiometry and radar instrumentation. The described deployable radiofrequency antenna system provides advantageous tradeoffs among size and design options, performance (e.g., swath coverage, resolution, and instrument noise), and cost/efficiency of operation. In an implementation, an EM Surface of the deployable radiofrequency antenna system can include a lightweight membrane lens. In the described deployable radiofrequency antenna system, the lightweight membrane lens antenna can be deployed from a very small package. In one implementation, the radiofrequency energy passes through the membrane lens toward the planet surface or another target body (e.g., a moon surface or surface of any astronomical body) or location (e.g., deep space when calibrating the antenna).

In one implementation, the described deployable radiofrequency antenna system incorporates a tensioned membrane lens aperture of substantially flat and flexible membranes that direct radiofrequency energy through passive phase-shifting elements on the membrane toward a target. The membrane is deployed by struts (e.g., bi-stable tapes) that unroll or otherwise extend from the body of the satellite and maintain the positioning of the lens membrane relative to the satellite body, although other deployment structures are contemplated. The phase-shifting provided by the membrane steers the radiofrequency beam to a 35.5-degree angle from the lens membrane surface toward the target, although other angles are contemplated. The lens aperture can rotate (e.g., at 14.6 rpm) to sweep out a wide observation swath across the target surface as the satellite travels in orbit. The radiofrequency signal can be a patch array feed or antenna feed positioned in or near the body of the satellite.

In one implementation, the membrane lens aperture can be deployed symmetrically with the instrumentation of the satellite body, such that the instrumentation lies on and directs radiofrequency energy along an axis that is coincident with the spin axis (e.g., an axis of rotation) and orthogonal to the rotating membrane, providing a substantially balanced rotating aperture relative to the satellite body. As such, the antenna feed can communicate the radiofrequency energy along the orthogonal axis in the direction of the membrane lens aperture, albeit typically in an expanding volume toward the membrane lens aperture. In addition, the deployed positioning of the membrane lens between the satellite body and the planet surface prevents the shading of solar arrays mounted on the satellite body and prevents the blockage or reduction of signal reception from the Global Positioning System (GPS) satellite constellation.

In another implementation, small cooperating actuating satellites or "satlets" ("satlet" is a term used in various DARPA-related efforts) with distributed control devices (e.g., thrusters, reaction wheels, control moment gyroscopes) can be deployed with the membrane, such as at the tape-membrane attachment points or along the tapes themselves. Interconnectivity of these cooperating devices can be through electrical circuits supported by the deployable tapes or structures used to deploy the membranes or by wireless systems (e.g., Wi-Fi, Bluetooth). Whether the cooperation is controlled by a central controller, which can be denoted as the "satellite bus" associated with housing or supporting the sensor and antenna feed hardware) or among peer relationships of the multiple satellites, the distributed system can be used to position the membrane lens and associated sensors the target. Such distributed control devices can also be used to assist in rotating the aperture toward deep space (e.g., for calibration) or toward any other target.

In alternative implementations, the orientation of the deployable radiofrequency antenna system can be reversed relative to the planet surface, with the satellite body being positioned between the planet surface and the membrane lens. In this orientation, the EM Surface can function similarly to a phase-shifting membrane reflector (e.g., a reflectarray) than a phase-shifting membrane lens, while maintaining similar packaging, cost, and size benefits.

In another implementation, the deployable radiofrequency antenna system deploys from nodes instead of a centralized satellite body. The EM Surface is deployed from nodes that deploy support structures to and/or from other nodes. Some or all of the nodes may be responsible for deploying the support structures. Some of the nodes may not have deployment mechanisms internally. One or more of the nodes may include one or more of instrumentation, one or more actuators, a power source (e.g., solar sources), a transceiver, and a controller. When deployed, this implementation may appear as a deployed EM Surface with nodes at positions on the periphery of the EM Surface and with support structures one or more of on the periphery of the EM Surface and across the EM surface.

In various implementations, the membrane lens can be angled (i.e., not orthogonal to the transmission axis) relative to the instrumentation, and the angling can be adjusted by changing the relative lengths of the support structures (e.g., tapes) that connect the satellite body to the membrane.

FIG. 1 illustrates an example environment 100 for use in deploying an example deployable radiofrequency antenna system 102 in multiple phases. The example environment 100 includes a target body 104 (e.g., the Earth or other astronomical object). In the example environment, a launch vehicle 108 launches from the Earth, typically with multiple stages. In one implementation, an engine stage is ignited at launch and burns through a powered ascent until its propellants are exhausted. The engine stage is then extinguished, and a payload stage separates from the engine stage and is ignited in a first phase 105. The payload is carried atop the payload stage into orbit in the first phase, contained within payload fairings 112 that form a nose cone to protect a launch vehicle payload against the dynamic pressure and aerodynamic heating during launch through an atmosphere.

In this first phase 105, the flexible membrane lens of the deployable radiofrequency antenna system 102 is illustrated as stowed in a small-volume undeployed state relative to the large-volume deployed state shown in a subsequent phase. In this case, the deployable radiofrequency antenna system 102 is smaller and is less massive than other deployable systems used for similar purposes.

In FIG. 1, the deployable radiofrequency antenna system 102 is shown in a second phase 107 in the space environment, with the payload fairings 112 jettisoned from a launch canister 114 that contains the deployable radiofrequency antenna system 102 in a stowed or undeployed state, including a satellite body 115 and an electromagnetic radiation directing surface (EM Surface) 116 illustrated as a flexible lens 116. The flexible lens 116 can be an electromagnetic radiation directing lens (EM Lens). While described as a deployable radiofrequency antenna system 102, the deployable radiofrequency antenna system 102 can be adapted to transmit, phase shift, and/or direct electromagnetic radiation in any portion of the electromagnetic spectrum (e.g., visible light, radio, microwave, infrared, ultraviolet, x-rays, gamma-rays, etc.) and may alternatively be called a deployable electromagnetic radiation antenna system.

EM Surfaces 116 are objects that include at least a portion adapted to phase-shift and/or direct electromagnetic radiation. While described as redirecting radiofrequency energy in implementations, the EM Surfaces 116 can be adapted to direct electromagnetic radiation of any frequency and/or wavelength, including ones outside of the radio wave portion of the electromagnetic spectrum. EM Surfaces 116 may include one or more flexible, semi-flexible, semi-rigid, rigid, both (perhaps alternating) rigid and panelized portions. Examples of EM Surfaces 116 are contemplated with portions that are unloaded and/or expanded when being deployed after launch from a stowed state before and during launch. A deployment instrument may include a device providing one or more of unfurling, unrolling, and unfolding of the EM Surface 116, perhaps by extending support structures (also herein referred to as deployable support structures) from the satellite body 115 and/or by deployment mechanisms, such as compression struts, tape cartridges for unrolling bistable tapes, and/or an inflation element (e.g., a compressed air source) for expanding inflatable supports. The EM Surfaces 116 may include multiple membranes or membrane layers. The EM Surface 116 may be a continuous surface or may be panelized or composed of multiple parts and assembled when deployed. The EM Surface 116 may be one or more of an optical or a radiofrequency responsive surface. The EM Surface 116 can have one or more of active and passive directional elements. When the flexible lens 116 is discussed, the implementations can apply to any EM Surface 116.

As shown in a deployed state in phase 109, the deployable radiofrequency antenna system 102 includes the satellite body 115 (having instrumentation 126) and a flexible lens 116 connected to the satellite body 115 by one or more deployable support structures illustrated as composite tape struts 118 (examples of compression struts) and tension lanyards 122. It should be appreciated that other support structures such as truss booms, inflatable systems, coiled longeron booms, pantographic structures, or otherwise extendable structures are contemplated. The satellite body 115 may include without limitation a variety of different subsystems, such as any combination of navigation subsystems, propulsion subsystems, control subsystems, communication subsystems, power subsystems, deployment subsystems, instrument subsystems, and any other payload subsystems.

The deployable radiofrequency antenna system 102 is shown in a deployed state in which the flexible lens 116 has been expanded to a larger area relative to the size of the flexible lens 116 in its undeployed state. The tensioning of the membranes of the flexible lens 116 into substantially parallel flat planes reduces the depth of the deployed surface(s) and requires fewer parts and less touch labor than other approaches. The flexible lens 116 deploys away from the satellite body 115 with the use of motorized tape deployer assemblies (not shown), which are mechanically or electronically synchronized to work in concert deploying and tensioning the antenna membrane lens. The composite tape struts deploy in compression to balance the tension loads of the membrane and a set of tensioned lanyards attached at each tape/membrane interface. The membrane/tape interface can include a spring tensioning system to afford compliance of the structure while maintaining the desired membrane tension for radiofrequency performance.

In the illustrated example, composite tape struts 118 extend radially outward from the satellite body 115 to unfurl the flexible lens 116 from its undeployed state to its deployed state. Locations near the periphery region at the perimeter of the expanded form of flexible lens 116 may be coupled directly or indirectly to distal ends or portions of the composite tape struts 118 or other support structures (e.g., distal ends or portions of the composite tape struts 118 relative to the satellite body 115), and the proximal ends or portions may be coupled directly or indirectly to a portion of the satellite body 115. For the purposes of this specification, coupling may but need not include attaching or attachment whether directly or indirectly. As the composite tape struts 118 extend, the ends of the composite tape struts push and/or pull to unfurl the flexible lens 116 from its undeployed state to its deployed state. In the deployed state, flexible lens 116 is extended to a substantially planar and/or flat arrangement (or arrangement with multiple planes, e.g., a multifaceted arrangement) where the flexible lens 116 is oriented perpendicular to a plane 120. For the purposes of this specification, substantially planar or substantially flat may mean that points on all or a portion of the deployed EM Surface 116 diverge by less than a predefined distance in a plane (e.g., the plane defined by the peripheral edges of the EM Surface 116) or a predefined angle relative to an edge (e.g., an edge among the peripheral edges of the EM Surface 116). For example, predefined distances may be between any or be one or more of 1 millimeter (mm), 2 mm, 3 mm, 4 mm, 5 mm, 6 mm, 7 mm, 8 mm, 9 mm, 1 centimeter (cm), 1.5 cm, 2 cm, 3 cm, 4 cm, 5 cm, 10 cm, 15 cm, 20 cm, 25 cm, and 30 cm. Predefined angles may be between any or be one or more of 1°, 2°, 3°, 4°, 5°, 6°, 7°, 8°, 9°, 10°, 15°, 20°, 25°, 30°, and 35°. Each composite tape strut 118 may be deployed in synchronicity where each of the composite tape struts 118 are the same length such that when flexible lens 116 is fully deployed, each composite tape strut 118 extends the same length from satellite body 115 at the same time. In this case, the deployed state of flexible lens 116 may be symmetric about the deployable radiofrequency antenna system 102, with the mass of the flexible lens 116 and the deployable support structures being evenly distributed about the deployable radiofrequency antenna system 102. In other implementations, the deployment may be asymmetric, such as with different lengths of composite tape struts 118.

In the illustrated example, the composite tape struts 118 may be a variety of struts that extend from satellite body 115. Composite tape struts 118 may be or include bi-stable tapes that can be unrolled to deploy and provide support for the flexible lens 116. For example, tape dispensers (not illustrated) associated with each composite tape strut 118 may be included as part of the deployable radiofrequency antenna system 102. Upon deployment of deployable radiofrequency antenna system 102, the tape dispensers may deploy the tapes (e.g., composite tape struts 118) from a rolled to an unrolled state. In this example, the tapes may be carpenter-style tapes where the tapes extend (e.g., unroll from the tape dispensers) to expand flexible lens 116 to its deployed state and provide structural rigidity to the deployed state of flexible lens 116.

In the illustrated example, the tension lanyards 122 may be affixed to or near the periphery region at the perimeter of the expanded form of the flexible lens 116 (e.g., the same points of attachment as the distal ends or portions of the composite tape struts 118 relative to the satellite body 115). In this case, when unfurling the flexible lens 116, the tension lanyards 122 provide tension to pull the flexible lens 116 taut to a substantially planar arrangement (e.g., planar relative to the plane 120). The tension may be provided by a lateral force with respect to plane 120 by one or more tensioning devices associated with composite tape struts 118 and/or flexible lens 116. These tensioning devices may be springs, pulleys, rollers, or other tensioning devices. These devices can be attached to the same locations near the periphery region at the perimeter of the expanded form of flexible lens 116 that the composite tape struts 118 are attached and can tension the tension lanyards 122 and cause the expanded form of the flexible lens 116 to be pulled to a substantially flat arrangement, parallel to the plane 120.

Additional tensioning devices (not shown) may also be connected to the proximal ends or portions of the composite tape struts 118 (e.g., the connection point of the composite tape struts 118 to satellite body 115). These tensioning devices may also be springs, pullies, rollers, or other tensioning devices. These tensioning devices may also be connected to the proximal ends or portions of the tension lanyards 122 and may also tension the tension lanyards 122 and cause the expanded form of flexible lens 116 to be pulled to a substantially flat, planar arrangement, parallel to the plane 120.

In the illustrated example, a facing surface 124 of the satellite body 115 faces the deployed flexible lens 116. The facing surface 124 may include at least the antenna feed and may be parallel to the same plane (i.e., the plane 120) into which the flexible lens 116 is deployed. For example, the flexible lens 116 may be deployed via composite tape struts 118 and tensioned by the tension lanyards 122 to a flat planar arrangement planar to the plane 120. In this case, the facing surface 124 of the satellite body 115 may be oriented parallel to the plane 120.

In some cases, satellite body 115 includes solar panels 117 and instrumentation 126, which may include one or more of a variety of instruments, including an energy emitting instrument. Such energy emitting instruments or antenna feeds may communicate (e.g., emit or receive) radiofrequency (RF) waves, infrared (IR) frequency waves, ultraviolet (UV) frequency waves, x-ray frequency waves, visible light frequency waves, or other energy frequency waves. The instrumentation 126 may be configured to emit a beam of radiofrequency energy or other electromagnetic radiation (e.g., centered about the axis 128 or through a center of the flexible lens 116) from the instrumentation 126. Such radiofrequency energy or other electromagnetic radiation may be used to measure the soil moisture content of the surface of the Earth or for other radio frequency applications (e.g., a radiometer). In some cases, the bottom face of the instrument 126 may be oriented parallel with the facing surface 124 of the satellite body 115. In this case, the beam of radiofrequency energy may be emitted orthogonally to the facing surface 124 of the satellite body 115. As discussed herein, the flexible lens 116 may be deployed in an orientation perpendicular to the facing surface 124 of the satellite body 115 (e.g., the plane 120 being parallel to the facing surface 124 of the satellite body 115). In this case, the beam of radiofrequency energy may be emitted orthogonally in relation to the plane 120 into which flexible lens 116 is deployed.

The flexible lens 116 includes a flexible aperture 130 constructed from multiple flexible membrane layers. The flexible aperture 130 may be an aperture that is contacted by the beam emitted from the instrumentation 126. In some cases, the aperture may shift the phase of the beam when the beam passes through the flexible aperture 130. For example, the beam may be emitted by the instrumentation 126 orthogonally to the plane 120 (e.g., the plane into which the flexible lens 116 is deployed). The beam may contact the flexible aperture 130 at a 90-degree angle (e.g., orthogonally) relative to the plane 120.

The one or more flexible membrane layers of the flexible aperture 130 can shift the phase of the beam, such as when the beam passes through flexible aperture 130, the beam redirected at an angle 136 relative to the direction that beam was emitted from the instrumentation 126. In one implementation, the phase shift results in a redirection angle of 35.5 degrees, although example ranges can be within the range of greater than zero degrees to about 45 degrees (e.g., the direction of the phase-shifted beam diverges from the original direction of transmission at an acute angle) or even outside of this range. For example, the beam may be emitted from the instrumentation 126 in a direction orthogonal to the plane 120. The flexible aperture 130 may shift the beam by 40 degrees, for example, relative to the orthogonal direction that beam was emitted. The shift in phase of the beam may allow the deployable radiofrequency antenna system 102 to direct the beam in a variety of directions, particularly when the flexible lens 116 is rotating relative to the satellite body 115.

In the illustrated implementation, the flexible lens 116 includes three flexible membranes 132. The flexible membranes allow for the beam to be passively phase-shifted via phase shifting elements mounted on or in the flexible membranes 132. For example, each flexible membrane 132 may contain an array of metallic elements that can support dual orthogonal linear polarization transmission. In this case, the lattice spacing of the metallic elements may be small compared to the wavelength of the beam, which can allow the flexible membrane to steer the beam path of the beam to the desired angle 136, as in relation to the axis 128 or to nadir.

The beam may be directed towards the target body 104 and may contact the surface of the target body 104 to measure the soil moisture content of the surface. However, in other examples, the beam may be used to measure different parameters (e.g., act as a radiometer). The deployable radiofrequency antenna system 102 may be oriented in a variety of directions relative to target body 104. For example, in some implementations, the deployable radiofrequency antenna system 102, as discussed previously, may utilize a reflector design, where the EM Surface 116 is used as a reflector, with the satellite body 115 being positioned between the target body 104 and the antenna aperture 130. The reflector can be an electromagnetic radiation directing reflector (EM Reflector).

Although illustrated as having a single substantially flat and/or planar surface, the EM Surface 116 may have more than one surface. For example, the EM Surface 116 can be a multi-faceted element with multiple substantially flat and/or planar surfaces. The EM Surface 116 may have a shape, for example, a pyramidal, triangular prismatic, rectangular prismatic (e.g., tent-like or v-shaped), other polygonal prismatic, spherical, hemispherical, curvilinear, or other shape. In implementations, the EM Surface 116 can have surfaces of the same or different sizes. The arrangements of the surfaces may be axisymmetrical about a center and/or central axis of the EM Surface 116. The EM Surface 116 can have some surfaces that pass electromagnetic beams and other surfaces that do not. In implementations, one or more of multiple facets of the EM surface and/or phase-shifting properties of the EM Surface can cooperatively or independently cause beam splitting of the beam of electromagnetic radiation at or within the EM Surface 116. Beam splitting may cause portions or elements of the beam of electromagnetic radiation to be emitted in different directions from the EM Surface 116.

In various implementations, the deployable radiofrequency antenna system 102 has actuators that can modify the orientation of the EM Surface 116 relative to one or more of the satellite body 115 and the target body 104. The plurality of actuators may each be coupled to one or more of the one or more support structures and the EM Surface 116. The couplings may be fixed and coupled to positions on the support structures. In this implementation, the transition from an undeployed state to a deployed state may include extending the actuators away from the satellite body 115 when support structures are extended to unfurl the EM Surface 116 and extend the EM surface 116 away from the satellite body 115. In this implementation, the actuators can be extended to positions closer to the EM Surface 116 than the satellite body 115. In another implementation, actuators may be elements of a rotatable coupling between the one or more support structures and the satellite body 115. In this implementation, the rotatable coupling can include one or more motorized mounts.

In implementations, the actuators cause rotation of the EM Surface 116, perhaps about an axis of rotation. The axis of rotation can be defined by one or more of a direction of the beam of radiofrequency energy communicated by or to an antenna feed (e.g., coincident with a first direction orthogonal to the plane 120), the axis 128, a central axis of the EM Surface 116, a central axis of the satellite body. The actuators can be axisymmetrically arranged about the EM Surface 116. The actuators can be configured to modify the orientation of the EM Surface 116 by collectively providing substantially axisymmetric motive forces about the EM Surface 116. The plurality of actuators can include one or more of thrusters, gyroscopes, reaction wheels, and magnetic propulsion devices. The actuators may be configured to modify the orientation of the EM Surface 116 by rotating the EM Surface without flexing the EM Surface 116 and/or while substantially maintaining phase-shifting properties of the EM Surface 116.

In other implementations, the actuators cause the deployable radiofrequency antenna system 102 to change orientations relative to the target body 104. For example, the actuators can be configured to modify the orientation of the EM Surface 116 by transitioning the deployable radiofrequency antenna system 102 between an orientation in which the EM Surface 116 is between satellite body and the target body 104 and an orientation in which the satellite body is between the EM Surface 116 and the target body 104. Examples of applications of the orientation in which the satellite body is between the EM Surface 116 and the target body 104 include ones where the EM Surface 116 functions as a reflector or ones where the EM Surface 116 is an EM Lens being calibrated. An application of the orientation in which the EM Surface 116 is between the satellite body 115 and the target body 104 is where the EM Surface 116 is an EM lens and is monitoring the target body 104.

The actuators can be controlled by one or more actuator controllers. In one implementation, the actuators are controlled by a controller located in the satellite body and communicatively coupled (e.g., wirelessly or by physical electronic couplings in the support structures) to the actuators. In an alternative implementation, one or more of the actuators include integrated controllers. The integrated controllers may include one or more master controllers that control other slave controllers or the control may be distributed among the integrated controllers differently (e.g., swarm or voting control methods). The actuators and/or actuator controllers may include independent and/or integrated power supplies (e.g., solar arrays) or may receive power from a power source in the satellite body 115. In implementations in which the actuators and/or actuator controllers draw power from the satellite body 115, the power may be supplied by physical electronic couplings (perhaps coupled to or collocated with the support structures) and/or by wireless transmission. Implementations are also contemplated in which the deployable radiofrequency antenna system 102 includes both a general controller in the satellite body and controllers specific to each actuator. The deployable radiofrequency antenna system 102 can include a transceiver to receive and transmit communications between the deployable radiofrequency antenna system 102 and an external computing system (e.g., a computing system on Earth). The external computing system can transmit instructions via the transceiver to the actuator controller(s) in order to modify an orientation of the EM Surface 116 relative to one or more of the satellite body 115 and the target body 104.

The deployable radiofrequency antenna system 102 can be further adapted to receive a received beam from the target body 104 in response to the resulting phase-shifted beam. In alternative implementations, the deployable radiofrequency antenna system 102 may be a passive system that receives the received beam that is not responsive to an emitted beam emitted by the deployable radiofrequency antenna system 102. The EM Surface 116 can phase shift the received beam to redirect the received beam in a direction that is substantially the reverse of the original direction from which the beam is communicated to or from the antenna feed. The deployable radiofrequency antenna system 102 may include an internal computing system (e.g., in the satellite body 115) that includes a processor and a memory, the processor to execute operations stored in memory. Operations can include receiving data representing the received beam, associating the data representing the received beam geometric associating data, and transmitting the data representing the received beam and the association to a different computing system. The computing system can further account, in the association, for any time between the emitting of the resulting phase-shifted beam (or the originally emitted beam) and the receiving data representing the received beam. The accounting may be conducted by a data generation module. The association can be further between the data representing the received beam and one or more of nadir an orbital position of the radiofrequency antenna system, and a rotational velocity of the EM Lens.

The generated data may be associated, using a data generation module, with geometric associating data to associate data representing electromagnetic radiation beams (e.g., a received and/or emitted beam(s)) with a relative geometric characteristic of the deployable radiofrequency antenna system. Geometric associating data may represent position and/or orientation of the deployable radiofrequency antenna system and/or the EM Surface 116 relative to one or more of, without limitation, a target, a monitoring station, an external computing device, a communication array, and nadir. Examples of geometric associating data include data representing one or more of an orientation of the EM Surface 116, nadir, an orbital position of the electromagnetic radiation antenna system 102, a timestamp for data transmitted and/or received from and/or by the deployable radiofrequency antenna system, a rate of oscillation (or rotational velocity) of an element of the electromagnetic radiation antenna system, and a rotational velocity of the EM Surface 116 and/or the deployable radiofrequency antenna system 102. The generated data may account for any time or position delay between transmission of an emitted beam (e.g., from a transmitting operation) to reception of a responsively received beam (e.g., in a receiving operation).

Figure 2:
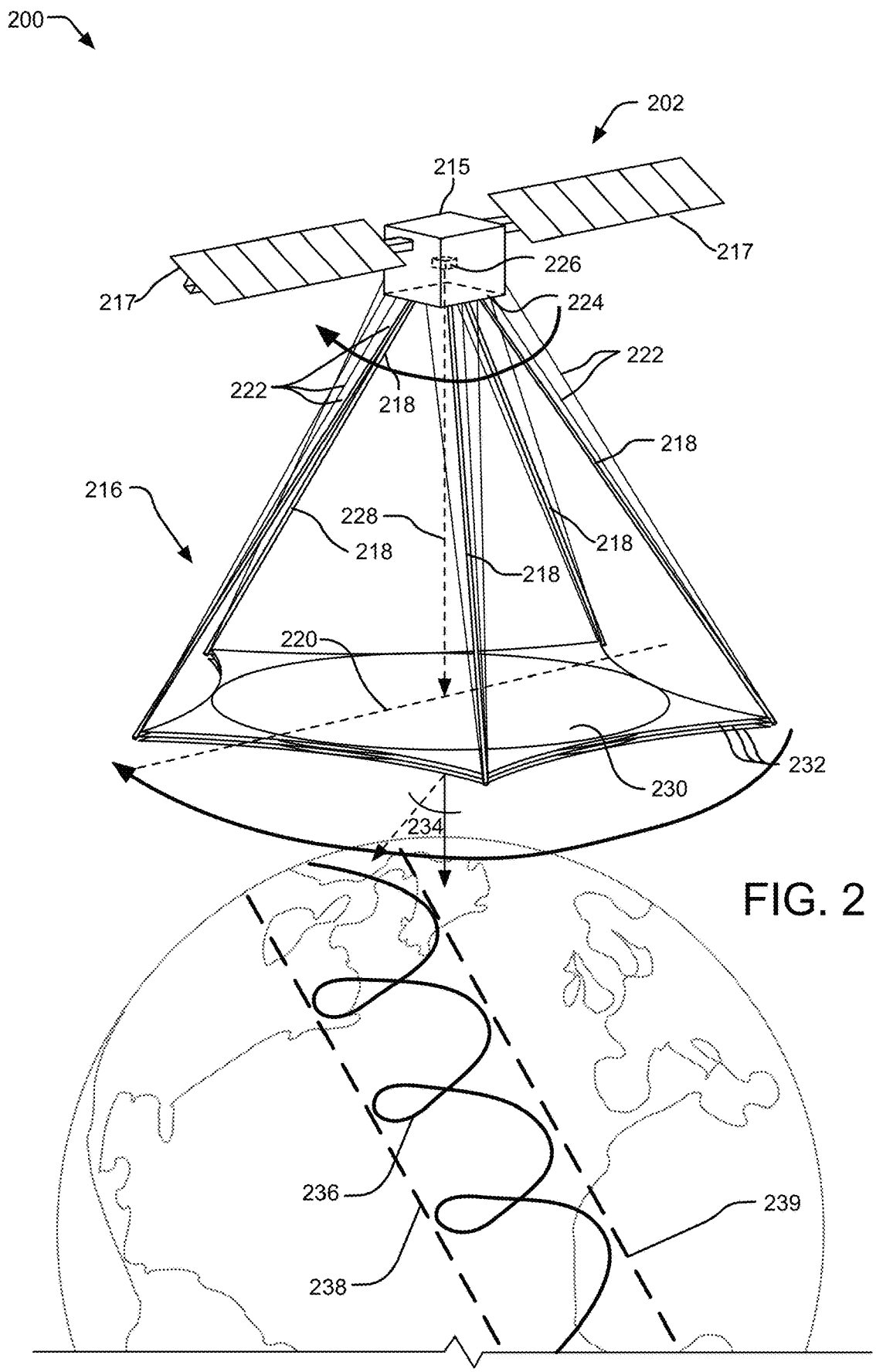
FIG. 2 illustrates an example deployable radiofrequency antenna system with a spinning lens aperture.

FIG. 2 illustrates an example deployable radiofrequency antenna system 200 with a spinning (or rotating) lens aperture 230. The deployable radiofrequency antenna system 202 may be an example of the deployable radiofrequency antenna system 102 of FIG. 1. The deployable radiofrequency antenna system 202 includes a satellite body 214 (including a facing surface 224), instrumentation 226, composite tape struts 218 (examples of compression struts), tension lanyards 222, solar panels 217, and a flexible lens 216 with an aperture 230 and multiple membranes 232. The flexible lens 216 is oriented in a plane 220. As with deployable radiofrequency antenna system 102 of FIG. 1, these features of deployable radiofrequency antenna system 202 may enable deployable radiofrequency antenna system 202 to direct a beam of radiofrequency energy toward the surface of a target body 204 (e.g., the Earth).

Similarly to deployable radiofrequency antenna system 102, the flexible lens 216 may be oriented orthogonally to the facing surface 224 of the satellite body 214 (e.g., the plane 220 being parallel to the facing surface 224). Also similarly to the deployable radiofrequency antenna system 102, a beam of radiofrequency energy may be emitted orthogonally to the plane 220 along an axis 228, albeit expanding as it travels toward the plane 220. The aperture 230 (which may include multiple membranes 232) can phase shift the angle of the beam from nadir to a desired angle 234. For example, the angle 234 of the beam may be shifted 40 degrees from nadir, although other angles are contemplated.

The deployable radiofrequency antenna system 202 may be an example of a rotating deployable system. In this case, some components of deployable radiofrequency antenna system 202 may rotate such that the phase-shifted beam is directed towards the surface of the target body 204 in a variety of directions as the components rotate (e.g., as the flexible lens 216 rotates). Once deployed, the flexible lens 216 can begin to rotate at a predetermined rotations-per-minute rate (e.g., at 15 rpm). In one implementation, this rotation results in a swirling swath or spiral pattern 236 along the surface of the target body 204 as the deployable radiofrequency antenna system 202 orbits the target body 204.

In such an implementation, components of the deployable radiofrequency antenna system 202 rotate with respect to each other. For example, the composite tape struts 218, the tension lanyards 222, and the flexible lens 216 rotate with respect to the satellite body 214. In this example, the satellite body 214 may include a rotatory drive (not illustrated) that is linked to the rotating components of the deployable radiofrequency antenna system 202.

The rotation of flexible lens 216 allows the beam to be directed towards the surface of the target body 204 in the spiral pattern 236. The spiral pattern 236 may measure the characteristics of the surface of the target body 204 within boundaries 238 and 239. For example, as the deployable radiofrequency antenna system 202 orbits around the target body 204, the deployable radiofrequency antenna system 202 travels a lateral distance with respect to the surface of the target body 204. As the flexible lens 216 rotates, the beam is directed in a circular pattern. The combination of the lateral travel of the deployable radiofrequency antenna system 202 and the circular pattern of the beam allows for the beam to sweep across the target body surface in a spiral pattern 236, covering areas of the surface of the target body 204 within the boundaries 238 and 239. As such, the areas of the surface of the target body 204 lying within the boundaries 238 and 239 can be measured over multiple orbits.

As discussed with respect to the deployable radiofrequency antenna system 102 of FIG. 1, the deployable radiofrequency antenna system 202 may be substantially symmetric in its deployed state. For example, the deployed state of the flexible lens 216 may be symmetric about the deployable radiofrequency antenna system 202 with the mass of the flexible lens 216 and the supporting structures (e.g., composite tape struts 218 and the tension lanyards 222) being evenly distributed about the satellite body 215.

Figure 3:
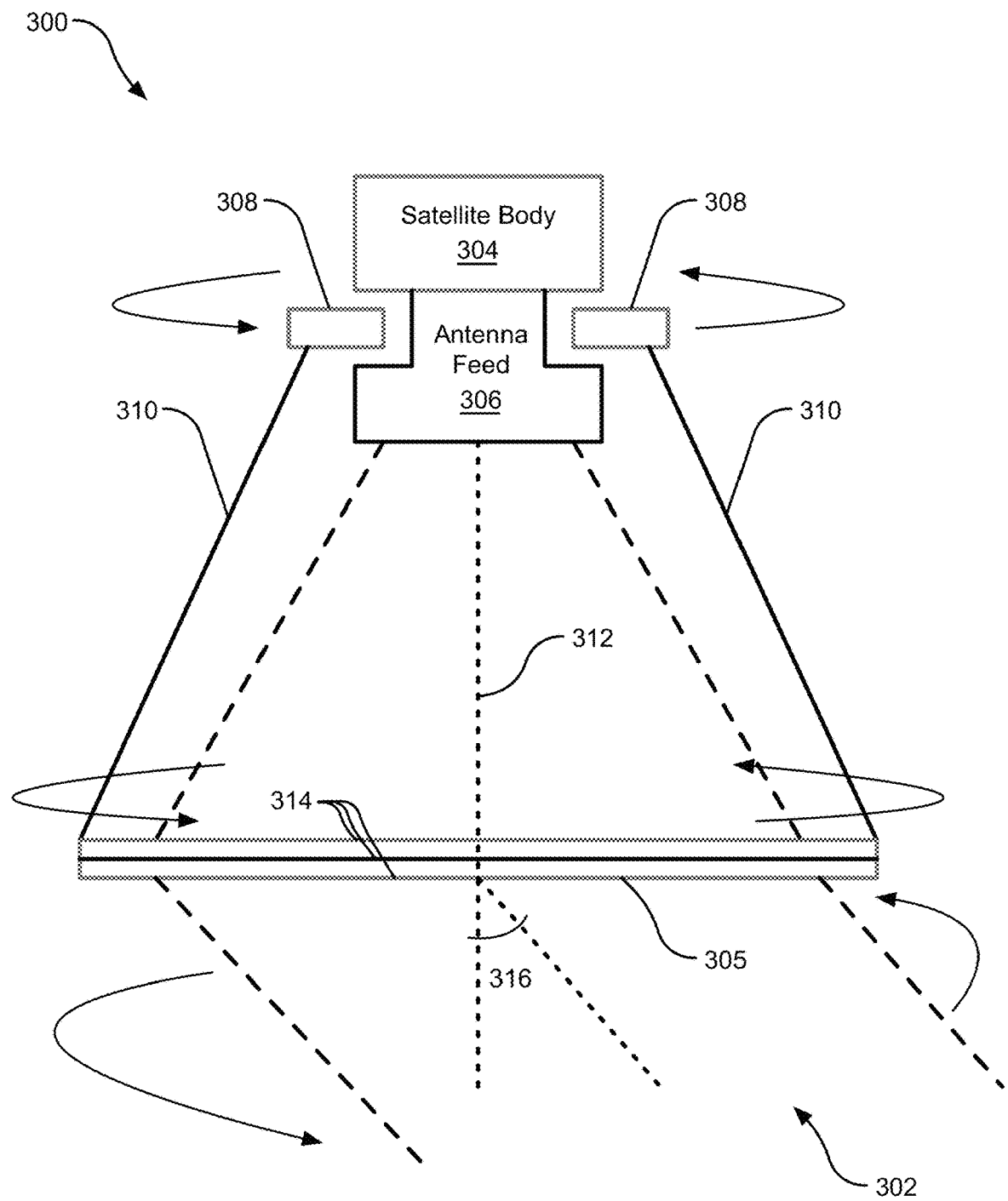
FIG. 3 illustrates a schematic representation of an example deployable radiofrequency antenna system with a spinning lens aperture.

FIG. 3 illustrates a schematic representation of an example deployable radiofrequency antenna system 300 with a spinning (or rotating) lens aperture 302. The deployable radiofrequency antenna system 300 includes a satellite body 304 and a flexible membrane lens 305. The satellite body 304 includes an antenna feed 306 and other instrumentation. A motorized rotary mount 308, shown in cross-section in the form of an annulus encircling the antenna feed 306, includes tape dispensers from which to dispense composite tape struts 310 (examples of compression struts) and lanyard dispensers from which to dispense tension lanyards (not shown). The flexible membrane lens 305 is deployed a distance from the satellite body 304 by the composite tape struts 310 along an axis 312. In the illustrated implementation, the flexible membrane lens 305 is orthogonal to the axis 312, although, in other implementations, the lengths of different composite tape struts 310 can differ, resulting in an angled position (i.e., not orthogonal to the axis 312) of the flexible membrane lens 305. The antenna feed 306 communicates a beam of electromagnetic energy (shown as dashed lines) along the axis 312 toward the flexible membrane lens 305.

The flexible membrane lens 305 consists of multiple flexible membranes 314 capable of phase-shifting the beam as it passes through the flexible membrane lens 305, as represented by changed angle 316 from the axis 312, redirecting the phase-shifted beam toward a target body. As the deployable radiofrequency antenna system 300 orbits the target body and the flexible membrane lens 305 rotates with respect to the satellite body 304, the phase-shifted beam tracks a swirling swath or spiral pattern along the surface of the target body.

Figure 4:
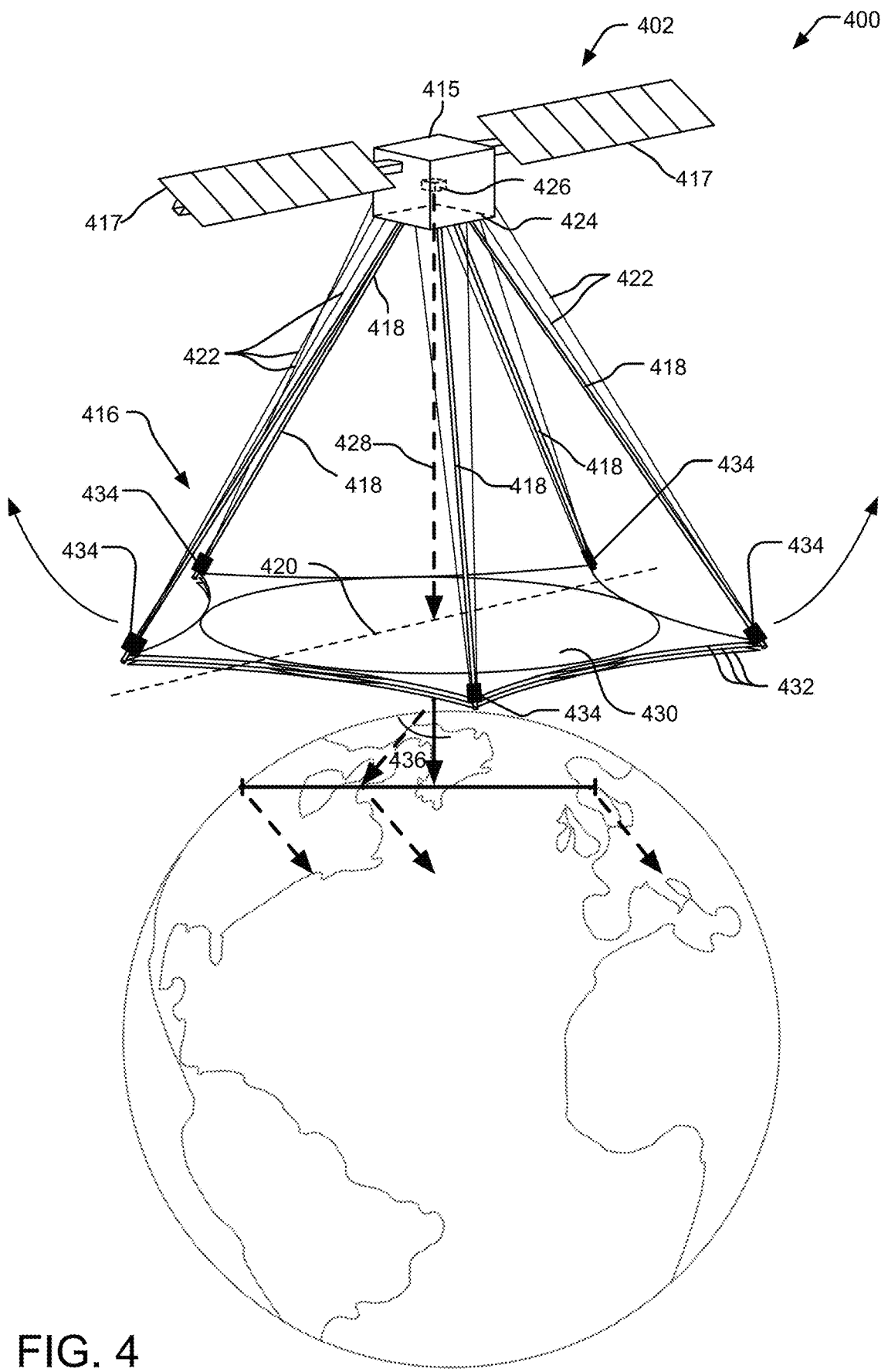
FIG. 4 illustrates an example deployable radiofrequency antenna system with a steerable aperture using distributed steering thrusters or attitude control mechanisms.

FIG. 4 illustrates an example deployable radiofrequency antenna system with a steerable aperture using distributed steering thrusters or attitude control mechanisms. The illustration includes an environment 400 including orientation of another example deployable radiofrequency antenna system 402. The deployable radiofrequency antenna system 402 includes a satellite body 415 (including a facing surface 424), instrumentation 426, composite tape struts 418 (examples of compression struts), tension lanyards 422, solar panels 417, and a flexible lens 416 (which may include an aperture 430 and multiple membranes 432) that is oriented in a plane 420. The deployable radiofrequency antenna system 402 can direct a beam of radiofrequency energy toward the surface of a target body 404 (e.g., the Earth).

The flexible lens 416 may initially be oriented orthogonally to the facing surface 424 of satellite body 415 (e.g., the plane 420 being parallel to facing surface 424). The beam of radiofrequency energy may initially be emitted orthogonal toward the plane 420 along an axis 428 that is orthogonal to the plane 420. The aperture 430 (which may include multiple membranes 432) can phase shift the angle of the beam from nadir to a desired angle. For example, the angle 436 of the beam may be shifted 40 degrees the orthogonal axis 428 or from nadir.

The deployable radiofrequency antenna system 402 may be an example of a deployable system that can be pointed toward a target. In this case, some components of deployable radiofrequency antenna system 402 can allow for flexible lens 416 to be aligned to direct the beam towards a target body 404 or other targets. For example, the deployable radiofrequency antenna system 402 may include actuating devices 434 (e.g., coordinated distributed thrusters, reaction wheels, control moment gyroscopes, which can be embodied in or as satlets), which can apply force to the flexible lens 416 and the associated sensor (e.g., positioned in the target body 404) to move the alignment of flexible lens 416. As such, the flexible lens 416, and therefore the alignment of the beam on with the surface of the target body 404 can be adjusted by these actuating devices 434.

Based on the steering provided by the actuating devices, the beam is phase shifted by an angle 436 as it passes through the flexible lens 416, as discussed with regard to other implementations. Accordingly, the phase-shifted beam can be steered to points or paths of interest on the surface of the target body 404.

Figure 5:
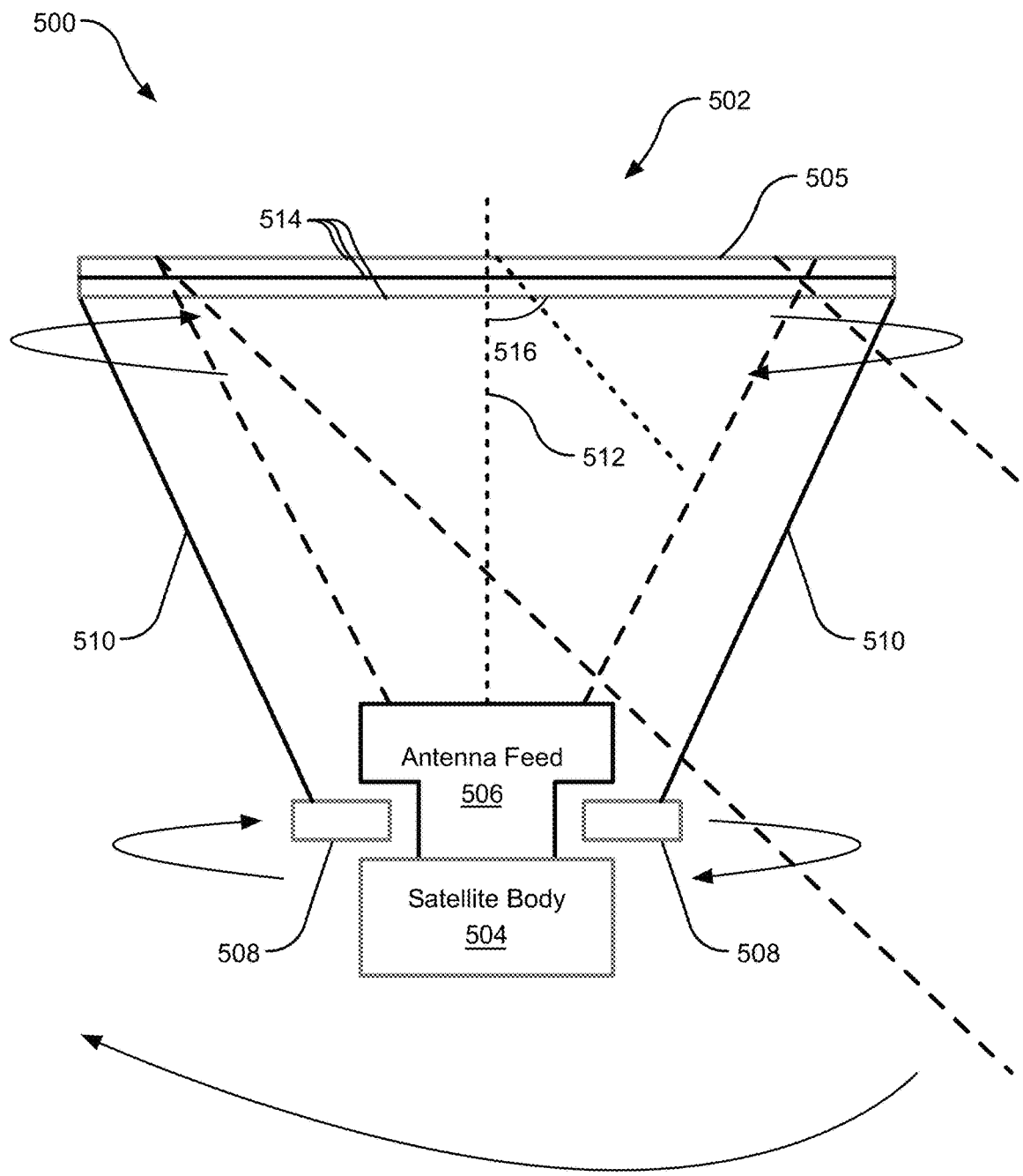
FIG. 5 illustrates a schematic representation of an example deployable radiofrequency antenna system with a spinning reflecting aperture.

FIG. 5 illustrates a schematic representation of an example deployable radiofrequency antenna system 500 with a spinning (or rotating) reflector aperture 502. In contrast to the implementations shown in FIGS. 1-4, the illustrated implementation replaces the flexible membrane lens with a flexible reflector membrane 505 The deployable radiofrequency antenna system 500 includes a satellite body 504 and the flexible reflector membrane 505. The satellite body 504 includes an antenna feed 506 and other instrumentation. A motorized rotary mount 508, shown in cross-section in the form of an annulus encircling the antenna feed 506, includes tape dispensers from which to dispense composite tape struts 510 (examples of compression struts) and lanyard dispensers from which to dispense tension lanyards (not shown). The flexible reflector membrane 505 is deployed a distance from the satellite body 504 by the composite tape struts 510 along an axis 512. In the illustrated implementation, the flexible reflector membrane 505 is orthogonal to the axis 512, although, in other implementations, the lengths of different composite tape struts 510 can differ, resulting in an angled position (i.e., not orthogonal to the axis 512) of the flexible reflector membrane 505. The antenna feed 506 emits a beam of electromagnetic energy (shown as dashed lines) along the axis 512 toward the flexible reflector membrane 505. The antenna feed 506 may similarly receive or otherwise communicate beams of electromagnetic energy.

The flexible reflector membrane 505 consists of multiple flexible membranes 514 capable of phase-shifting the beam as it reflects off of the flexible reflector membrane 505, as represented by the changed angle of reflection 516 from the axis 512, redirecting the phase-shifted beam toward a target body. As the deployable radiofrequency antenna system 500 orbits the target body and the flexible reflector membrane 505 rotates with respect to the satellite body 504, the phase-shifted beam tracks a swirling swath or spiral pattern along the surface of the target body.

Figure 6:
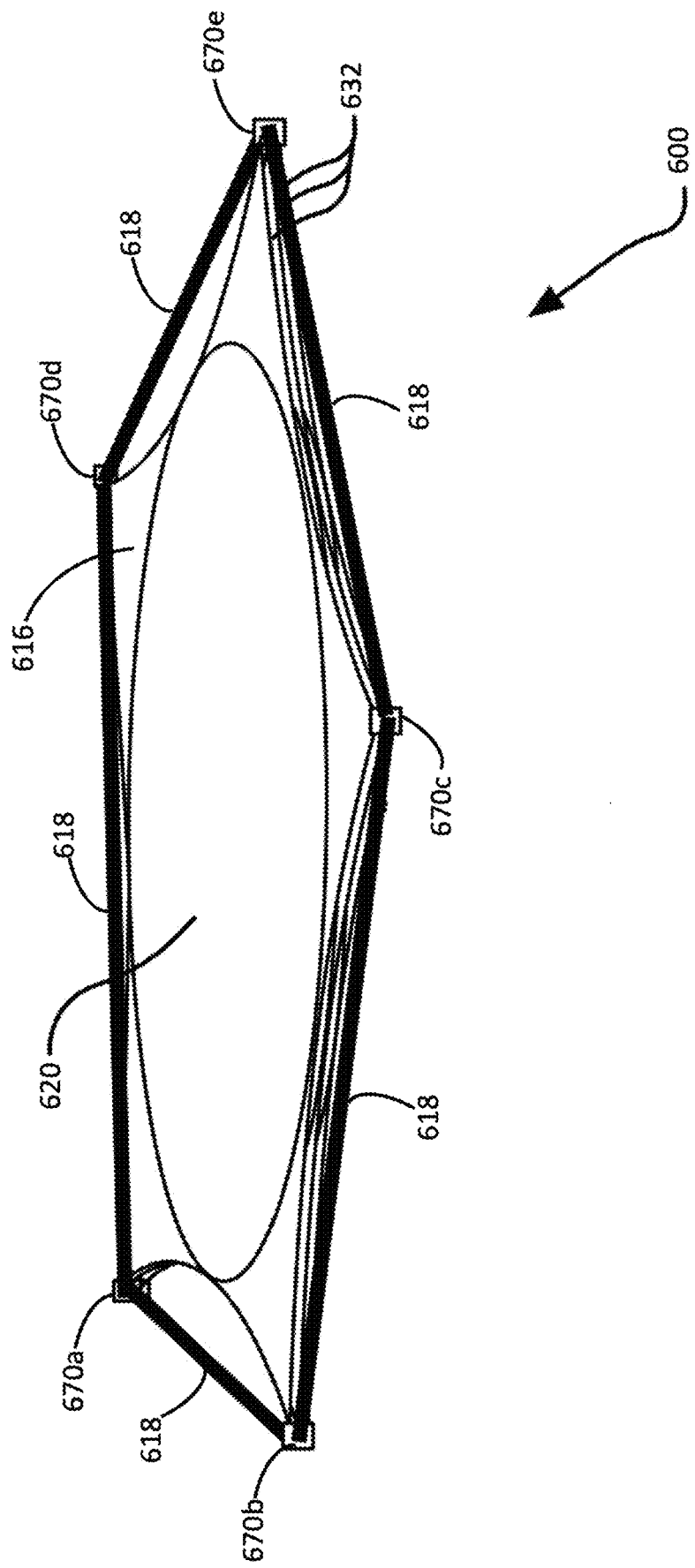
FIG. 6 illustrates a schematic representation of an example deployable radiofrequency antenna system.

FIG. 6 illustrates a schematic representation of an example deployable radiofrequency antenna system 600. As illustrated, an EM Surface 616 is an EM Lens with multiple membranes 632 and a lens aperture 620. Implementations are contemplated where the EM Surface 616 is an EM Reflector and/or has a different number of membranes or a single membrane. Also, as illustrated, the radiofrequency antenna system 600 has no satellite body (though implementations are contemplated with a satellite body). The EM Surface 616 may be deployed from nodes 670a-e. Nodes 670a-e may include deployment mechanism nodes that deploy support structures 618 to and/or from other nodes 670a-e by means of deployment mechanisms. Some or all of the nodes 670a-e may be responsible for deploying the support structures 618 using one or more deployment mechanisms. The deployable radiofrequency antenna system 600 is illustrated as in an exemplary deployed state.

Some of the nodes 670a-e may be passive nodes that do not include deployment mechanisms internally. One or more of the nodes 670a-e may include one or more of instrumentation, one or more actuators, a power source (e.g., solar sources), a transceiver, a computing system with a processor and memory to process data and associating data, and a controller. When deployed, this implementation may appear as a deployed EM Surface 616 with nodes 670a-e at positions on the periphery of the EM Surface 616 and with deployable support structures 618 one or more of on the periphery of the EM Surface 616 and across the EM Surface 616 (not illustrated).

In implementations of the deployable electromagnetic radiation antenna system 600, the deployable support structures 618 have a first end coupled to the EM Surface 616. The deployable electromagnetic radiation antenna system 600 may have a plurality of deployment mechanism nodes (e.g., one or more of 670a-e), each coupled to a second end of a corresponding support structure 618 and configured to deploy at least one deployable support structure 618 away from a corresponding deployment mechanism node (e.g., one or more of 670a-e) to form at least one substantially planar surface in the electromagnetic radiation directing surface 616. The deployable electromagnetic radiation antenna system 600 may additionally or alternatively include a plurality of passive nodes (e.g., one or more of 670a-e). In implementations, each passive node (e.g., one or more of 670a-e) is coupled to a second end of a different corresponding support structure 618 of the deployable support structures 618. The passive nodes (e.g., one or more of 670a-e) may not have active mechanisms for deploying the one or more deployable support structures 618. Any of the passive or deployment mechanism nodes (e.g., 670a-e) can include one or more actuators (not illustrated) configured to actuate movement of the deployed EM Surface 616.

Implementations are contemplated where the arrangement of passive and deployment mechanism nodes (e.g., 670a-e) is axisymmetric about the EM Surface 616. For example, the arrangement of the passive and deployment mechanism nodes (e.g., 670a-e) is staggered about a periphery of the EM Surface 616. While illustrated as substantially pentagonal with curvilinear sides, the EM Surface 616 can be deployed in any shape whether polygonal, prismatic (e.g., having facets), circular, spherical, elliptical, curvilinear, and others while having any number of surfaces. A number of a total of passive and deployment mechanism nodes (e.g., one or more of 670a-e) may provide balance and prevent or limit net moments when actuating movement (e.g., by having an even number of total nodes 670a-e). In implementations with a staggered configuration of the passive and deployment mechanism nodes (e.g., 670a-e), each deployment mechanism node (e.g., one or more of 670a-e) may deploy two or more support structures 618, one to each of one or more passive and/or deployment mechanism nodes (e.g., 670a-e).

Implementations are contemplated in which there are deployment mechanism nodes (e.g., one or more of 670a-e) and no passive nodes (e.g., one or more of 670a-e). In these implementations, the deployment mechanism nodes (e.g., one or more of 670a-e) may be daisy-chained about a periphery of the EM Surface 616 such that each is extended away by a support structure 618 deployed by a first adjacent peripheral deployment mechanism node (e.g., one or more of 670a-e) and also extends\a second adjacent peripheral deployment mechanism node (e.g., one or more of 670a-e) away by extending, using a deployment mechanism, a different support structure 618. Implementations are also contemplated in which the deployed deployable electromagnetic radiation antenna system 600 has crosslinked support structures (not illustrated) 618 that couple nodes across (e.g., above or below a surface of) the EM Surface 616. In these implementations, the support structures 618 may be narrow or may be composed of substantially transparent to electromagnetic radiation of a spectrum to be used with the EM Surface 616. These crosslinked support structures 618 may be composed of the same or different material as the illustrated peripheral support structures 618. The support structures 618 may be further opposed or otherwise reinforced by lanyards (not illustrated) similarly to the other implementations demonstrated that use the lanyards (the lanyards also potentially considered elements of the support structures).

Although not illustrated, implementations of the deployable electromagnetic radiation antenna system 600 are contemplated which include a satellite body to which one or more of the nodes 670*a-e* is statically attached or otherwise coupled. For example, one or more of the nodes 670*a-e* may be proximal to the satellite body with others extendable away to be distal from the satellite body in the deployed state.

Figure 7:
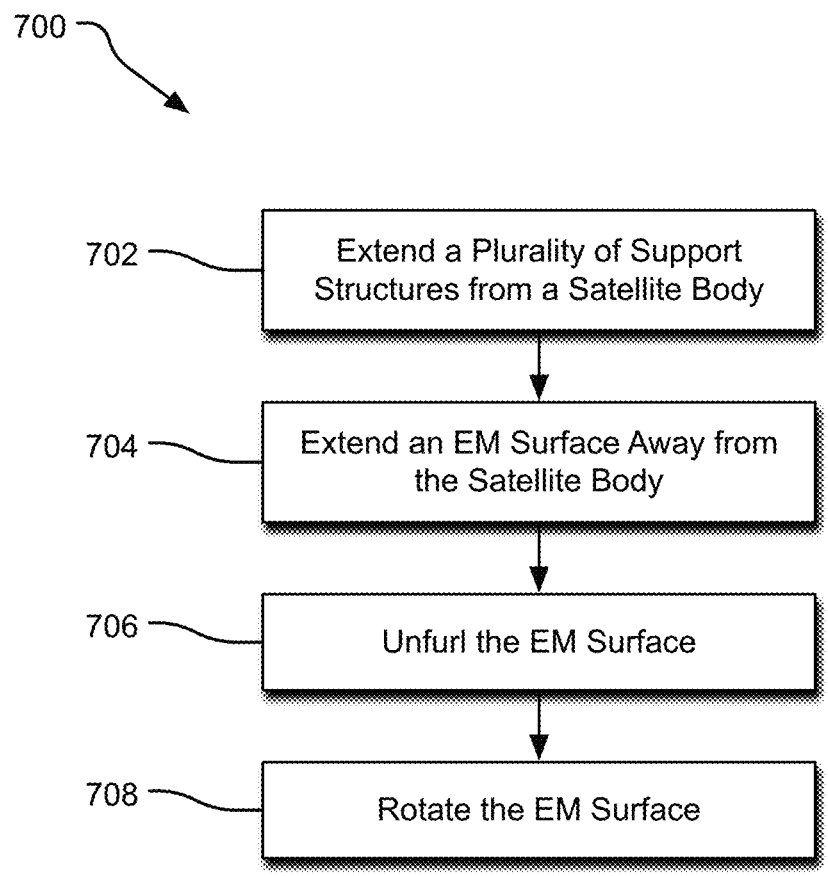
FIG. 7 illustrates example operations for deploying an electromagnetic radiation antenna system.

FIG. 7 illustrates example operations 700 for deploying an electromagnetic radiation antenna system. Extending operation 702 extends one or more deployable support structures from a satellite body. When transitioning from an undeployed configuration to a deployed configuration, the electromagnetic radiation antenna system may unpack components such as a satellite body, the one or more structures, and an EM Surface. In implementations, one or more of the supports structures, the satellite body, and the EM Surface may include coupled actuators. The extending operation 702 may be conducted in a direction away from the satellite body and/or radially outward from the satellite body. The extension may be the same or different for the one or more deployable support structures. The extension may involve dispensing tape, inflating a structure, or otherwise assembling the support structures to extend away from the satellite body. The extension may be facilitated by a deployment mechanism.

Extending operation 704 extends the EM Surface coupled to the support structures away from the satellite body. The extending operation 704 may be at least partially a result of the extending operation 702 extending the support structures away from the satellite body. In implementations in which one or more of the support structures and the EM Surface are coupled to actuators, one or more of extending operations 702, 704 may include extending the actuators away (and/or substantially radially outward) from the satellite body. In implementations, the EM Surface may be an EM Reflector or EM Lens. The extending operation 704 may include positioning the EM Surface in a first direction relative to the satellite body. The extension may be facilitated by a deployment mechanism.

Implementations are contemplated where the electromagnetic radiation antenna system does not include a satellite body. In these implementations, the extending operation 702 and the extending operation 704 may occur between nodes (whether passive or deployment mechanism nodes) as described with reference to FIG. 6.

Unfurling operation 706 unfurls the EM Surface. The unfurling operation 706 may be effectuated at least in part by extending operation 702 extending support structures radially from the satellite body. The unfurling operation 706 may involve one or more of unrolling, flexing, unflexing, unraveling, unfolding, or assembling panelized or otherwise componentized EM Surfaces. The unfurling operation 706 may result in a substantially flat EM Surface, perhaps tensioned by the support structures (e.g., struts and lanyards) to remain substantially flat.

Rotating operation 708 rotates the EM Surface relative to one or more of the satellite body, a rotation axis, and a target body. The rotating operation 708 may be omitted in implementations where the electromagnetic radiation antenna system is not adapted to rotate or has yet to effectuate a rotation. Rotating operation 708 may facilitate angled transmission and reception across a swirling swath or spiral pattern along the surface of a target body. The spiral pattern may measure the characteristics of the surface of the target body within a first and second boundary. For example, as the deployable electromagnetic radiation antenna system orbits around the target body, the deployable radiofrequency antenna system travels a lateral distance with respect to the surface of the target body. As the EM Surface rotates, the beam is directed in a circular pattern. The combination of the lateral travel of the deployable radiofrequency antenna system and the circular pattern of the beam allows for the beam to sweep across the target body surface in a spiral pattern, covering areas of the surface of the target body within the first and second boundaries. As such, the areas of the surface of the target body lying within the first and second boundaries can be measured over multiple orbits.

Figure 8:
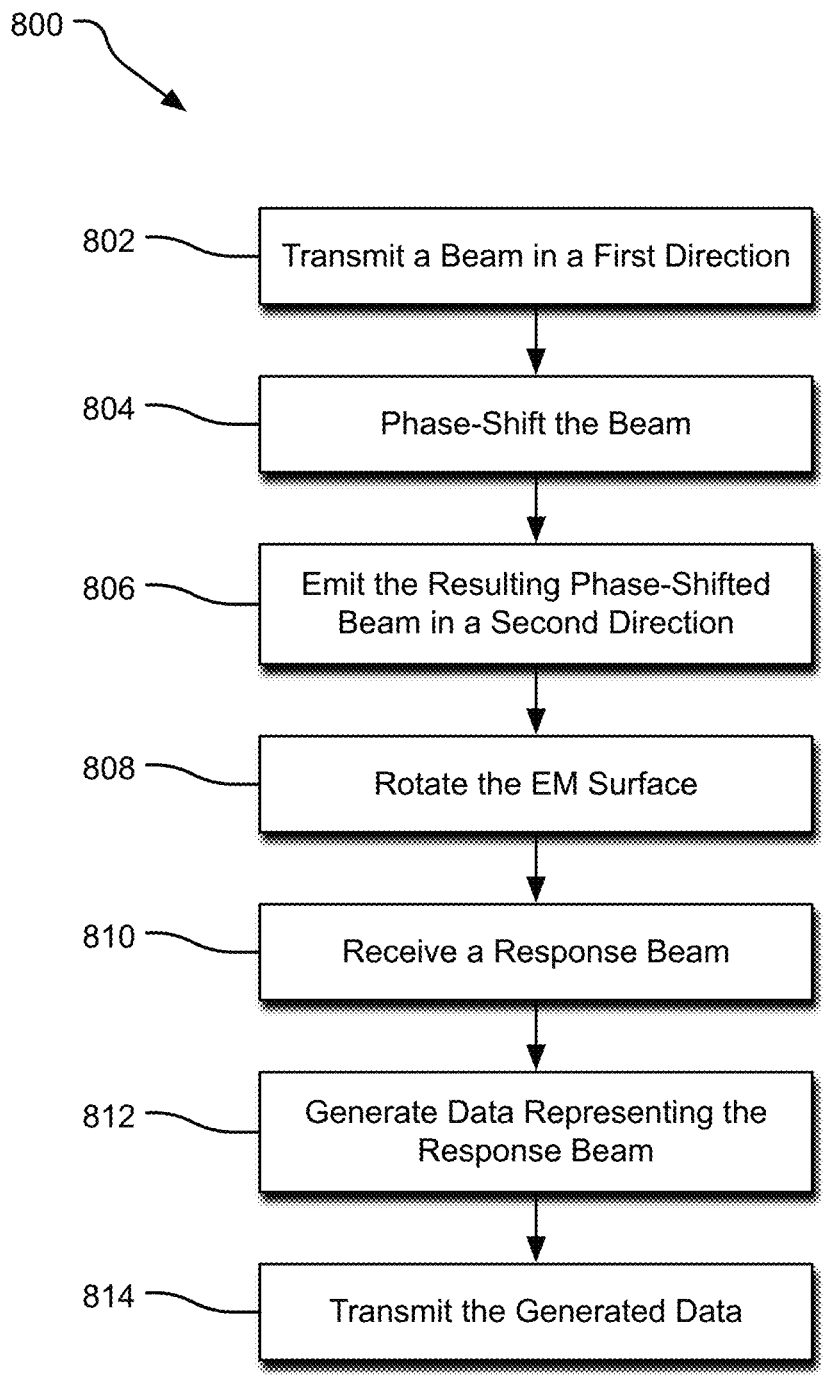
FIG. 8 illustrates example operations for using an electromagnetic radiation antenna system.

FIG. 8 illustrates example operations 800 for using an electromagnetic radiation antenna system. Transmitting operation 802 transmits a beam of electromagnetic radiation in a first direction from a satellite feed to an EM Surface. The beam of electromagnetic radiation (EMR) may include EMR on any part of the electromagnetic spectrum. In an implementation, the transmitted beam is centered on a center of the EM Surface.

Phase-shifting operation 804 phase-shifts the beam in the EM Surface. The face shifting may cause a resulting phase-shifted beam responsively emitted from the EM Surface to be emitted in a direction other than the first direction. The EM Surface, perhaps a multilayer EM Surface, allows for the beam to be passively phase-shifted via phase shifting elements mounted on or in the EM Surface (and/or one or more layers of the EM Surface). For example, each phase-shifting layer of the EM Surface may contain an array of metallic elements that can support dual orthogonal linear polarization transmission. In this case, the lattice spacing of the metallic elements may be small compared to the wavelength of the beam, which can allow the flexible membrane to steer the beam path of the beam to the desired angle, as in relation to a rotational axis or to nadir.

Emitting operation 806 emits the resulting phase-shifted beam of electromagnetic radiation from the EM Surface in a second direction different from the first direction. In implementations in which the EM Surface is an EM Lens, the beam is transmitted through the EM Lens and emitted from a surface of the EM Lens opposite the surface at which the EM Lens received the transmitted beam. In implementations in which the EM Surface is an EM Reflector, the beam is transmitted through the EM Reflector and emitted from a same surface of the EM Reflector as the surface at which the EM Reflector received the transmitted beam. Implementations are contemplated in which the emitting operation 806 is omitted. For example, the system may be a passive system that receives signals that are not responsive to signals emitted by the system.

Rotating operation 808 rotates the EM Surface relative to one or more of the satellite body, a rotation axis, and a target body. The rotating operation 808 may be omitted in implementations where the electromagnetic radiation antenna system is not adapted to rotate or has yet to effectuate a rotation. Rotating operation 808 may facilitate angled transmission and reception across a swirling swath or spiral pattern along the surface of a target body. The spiral pattern may measure the characteristics of the surface of the target body within a first and second boundary. For example, as the deployable electromagnetic radiation antenna system orbits around the target body, the deployable radiofrequency antenna system travels a lateral distance with respect to the surface of the target body. As the EM Surface rotates, the beam is directed in a circular pattern. The combination of the lateral travel of the deployable radiofrequency antenna system and the circular pattern of the beam allows for the beam to sweep across the target body surface in a spiral pattern, covering areas of the surface of the target body within the first and second boundaries. As such, the areas of the surface of the target body lying within the first and second boundaries can be measured over multiple orbits. In an implementation, the rotating operation 808 is at least partially facilitated by a rotatable coupling between the satellite body and the support structures to which the EM Surface is coupled. In this implementation, the EM Surface may rotate relative to the satellite body. In various implementations, the rotation may be effectuated by actuators. In one implementation, the actuators are coupled to one or more of the support structures and the EM Surface. In another implementation, the rotation may be actuated by motorized mounts, perhaps at a rotatable coupling between the support structures and the satellite body.

Receiving operation 810 receives a received beam representing a response by a target body to the resulting phase-shifted beam. The beam may be received by reception elements in the electromagnetic radiation antenna system, such as a transceiver, and may be received via the EM Surface. The receiving operation 810 may involve phase shifting by the EM Surface the received beam, which may at least partially redirect the received beam towards the satellite body (e.g., in a direction substantially the reverse of the first direction). Implementations are contemplated in which receiving operation 810 is omitted. For example, the reception of the received beam may be conducted by a different system, such as a land-based system or other satellite system.

Generating operation 812 generates data representing the received beam. The received beam may indicate measurements or other conditions of the portion of the target body from which the received beam was emitted. The data may be generated by a data generation module configured to determine measurements and/or conditions associated with the received beam. In an implementation in which the electromagnetic radiation satellite system generates the data, the data generation module may be stored in memory of a computing device in the satellite system and executed by a processor of the computing device. Alternatively, base sensor readings may be transmitted from the satellite body (perhaps with a simple computing system) to an external computing system. The generated data may be associated, using the data generation module, with geometric associating data to associate data representing electromagnetic radiation beams (e.g., received and/or emitted beams) with a relative geometric characteristic of the deployable radiofrequency antenna system. Geometric associating data may represent a position and/or orientation of the deployable radiofrequency antenna system and/or the EM Surface relative to one or more of, without limitation, a target, a monitoring station, an external computing device, a communication array, and nadir. Geometric associating data may represent a position and/or orientation of the EM Surface relative to other elements of the radiofrequency antenna system. Examples of geometric associating data include data representing one or more of an orientation of the EM Surface, nadir, an orbital position of the electromagnetic radiation antenna system, a timestamp for data transmitted and/or received to and/or from the deployable radiofrequency antenna system, a rate of oscillation of an element of the radiofrequency antenna system, and a rotational velocity of the EM Surface and/or the deployable radiofrequency antenna system. The timestamp may be associated with other known data to determine a position of the electromagnetic radiation antenna system. In active systems that both transmit and receive electromagnetic radiation beams, the generated data may account for any time or position delay between transmitting an emitted beam (e.g., from the transmitting operation 802) to receiving a received beam (e.g., in receiving operation 810) that represents a response to the emitted beam.

Transmitting operation 814 transmits any generated data and associations to a different computing system. The different computing system may be external of but in wireless communication with the electromagnetic radiation antenna system. The transmission may be wireless and to a base station computing system on a planet or in a space station.

Figure 9:
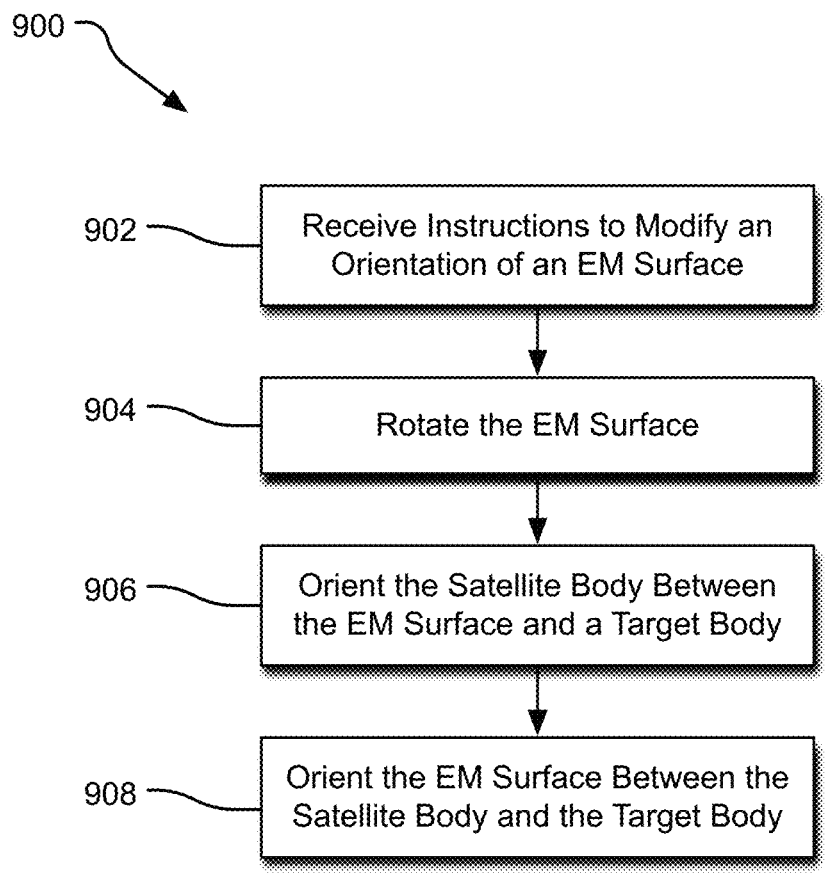
FIG. 9 illustrates example operations for using actuators of an electromagnetic radiation antenna system.

FIG. 9 illustrates example operations 900 for using actuators of an electromagnetic radiation antenna system. Examples of actuators include one or more of thrusters, gyros, reaction wheels, and magnetic propulsion devices. Receiving operation 902 receives instructions to modify the orientation of the EM Surface. The instructions may originate from an external computer system and be wirelessly transmitted to a transceiver, perhaps on the satellite body. The instructions may be received by one or more of controllers of actuators and a central controller of the satellite body communicatively coupled to elements of the actuators.

Control may be entirely effectuated by the central controller (e.g., a computing system) in the satellite body. In another implementation, control may be by controllers integrated into or otherwise substantially adjacent to the actuators. The controllers may follow a master-slave model in which one or more controllers are masters and the other controllers are slaves. Alternatively or additionally, control may be distributed among the controllers (e.g., by swarm or voting control methods). Power for the controllers and/or actuators may be provided by a power source on the satellite body to the controller via wireless transmission or physical electronic coupling (e.g., the physical electronic coupling running inside of, adjacent to, or coupled to the support structures). Alternatively, the controllers may include independent power sources (e.g., a solar panel). Control protocols may be elements of a controller module stored in memory in one or more of an actuator controller or a general control Various implementations of arrangements of actuators are contemplated. In one implementation, the actuators are coupled to one or more of the support structures and the EM Surface. In this implementation, the actuators may be closer to the EM Surface than the satellite body. In another implementation, the rotation may be actuated by motorized mounts, perhaps at a rotatable coupling between the support structures and the satellite body. In an implementation, the actuators are arranged axisymmetrically about the EM Surface.

Rotating operation 904 rotates, using the actuators, the EM Surface relative to one or more of the satellite body, a rotation axis, and a target body. The rotating operation 904 is an example of a modification of the orientation of the electromagnetic radiation antenna system. The rotating operation 904 may be omitted in implementations where the electromagnetic radiation antenna system is not adapted to rotate or has yet to effectuate a rotation. The rotating operation 904 may facilitate angled transmission and reception across a swirling swath or spiral pattern along the surface of a target body. The spiral pattern may measure the characteristics of the surface of the target body within a first and second boundary. For example, as the deployable electromagnetic radiation antenna system orbits around the target body, the deployable radiofrequency antenna system travels a lateral distance with respect to the surface of the target body. As the EM Surface rotates, the beam is directed in a circular pattern. The combination of the lateral travel of the deployable radiofrequency antenna system and the circular pattern of the beam allows for the beam to sweep across the target body surface in a spiral pattern, covering areas of the surface of the target body within the first and second boundaries. As such, the areas of the surface of the target body lying within the first and second boundaries can be measured over multiple orbits.

In an implementation, the rotating operation 904 is at least partially facilitated by a rotatable coupling between the satellite body and the support structures to which the EM Surface is coupled. In this implementation, the EM Surface may rotate relative to the satellite body.

The rotating operation 904 may include the actuators providing axisymmetric force about the EM Surface. In an implementation, the rotating operation 904 is actuated without flexing the EM Surface (or substantially limiting the flex allowed, perhaps to a predefined degree) and/or while substantially maintaining phase-shifting properties of the EM Surface.

Orienting operation 906 orients the satellite body, using the actuators, between the EM Surface and a target body. Examples of situations where this orientation may be used include one where the EM Surface is an EM Reflector that is used to measure properties of portions of the target body and one where the EM Surface is an EM Lens that is being calibrated. The orienting operation 906 may be omitted in circumstances where other elements are responsible for the relative orientation of the satellite body, EM Surface, and a target body.

Orienting operation 908 orients the EM Surface, using the actuators, between the satellite body and a target body. Examples of situations where this orientation may be used include one where the EM Surface is an EM Lens, and the EM Lens is being used to measure properties of positions on the target body. The orienting operation 906 may be omitted in circumstances where other elements are responsible for the relative orientation of the satellite body, EM Surface, and a target body.

Figure 10:
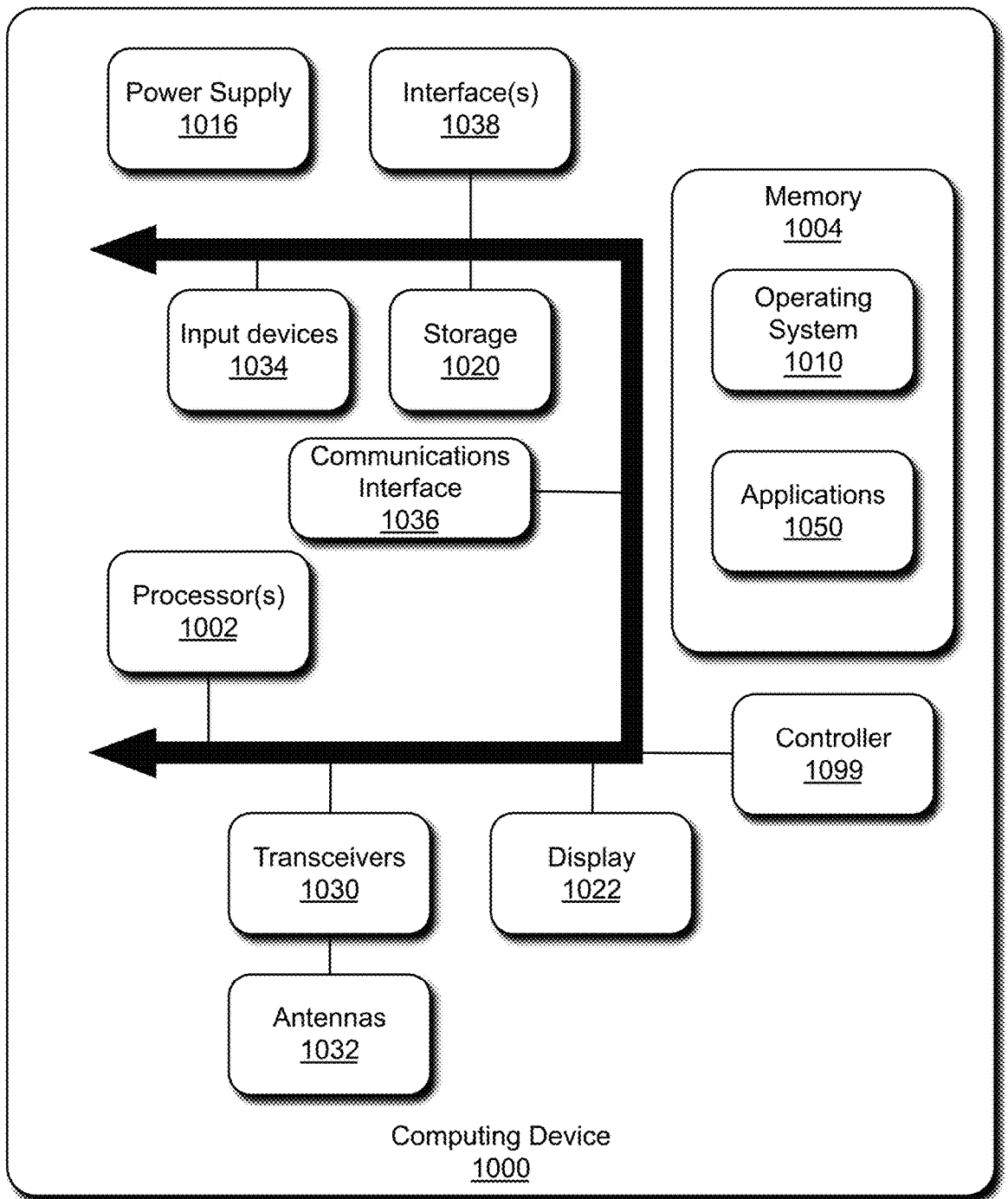
FIG. 10 illustrates an example computing device for implementing the features and operations of the described technology.

FIG. 10 illustrates an example computing device 1000 for implementing the features and operations of the described technology. The computing device 1000 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 1000 may be an implementation of one or more of the described external computing system, the computing system in the satellite body, and any of the described controllers (e.g., general controllers and actuator controllers). The computing device 1000 includes one or more processor(s) 1002 and a memory 1004. The memory 1004 generally includes both volatile memory (e.g., RAM) and nonvolatile memory (e.g., flash memory). An operating system 1010 resides in the memory 1004 and is executed by the processor(s) 1002.

In an example computing device 1000, as shown in FIG. 10, one or more modules or segments, such as applications 1050, data generation modules and/or controller modules are loaded into the operating system 1010 on the memory 1004 and/or storage 1020 and executed by processor(s) 1002. The storage 1020 may include one or more tangible storage media devices and may store generated measurement data, associating data, sensor readings, data representing a received beam, data representing an angle between a first transmitted beam direction and a second phase-shifted direction, data representing an orientation of the EM Surface, data representing a time delay between the emitting of the resulting phase-shifted beam (or the originally emitted beam), data representing nadir, data representing an orbital position of the radiofrequency antenna system, data representing a rotational velocity of the EM Lens, locally and globally unique identifiers, requests, responses, and other data and be local to the computing device 1000 or may be remote and communicatively connected to the computing device 1000.

The computing device 1000 includes a power supply 1016, which is powered by one or more batteries or other power sources and which provides power to other components of the computing device 1000. The power supply 1016 may also be connected to an external power source that overrides or recharges the built-in batteries or other power sources.

The computing device 1000 may include one or more communication transceivers 1030, which may be connected to one or more antenna(s) 1032 to provide network connectivity (e.g., mobile phone network, Wi-Fi®, Bluetooth®) to one or more other servers and/or client devices (e.g., mobile devices, desktop computers, or laptop computers). The computing device 1000 may further include a network adapter 1036, which is a type of computing device. The computing device 1000 may use the adapter and any other types of computing devices for establishing connections over a wide-area network (WAN) or local-area network (LAN). It should be appreciated that the network connections shown are examples and that other computing devices and means for establishing a communications link between the computing device 1000 and other devices may be used. The transceivers 1030 may include any elements used to receive or transmit instructions or other data in the disclosed operations and with regard to the disclosed implementations.

The computing device 1000 may include one or more input devices 1034 such that a user may enter commands and information (e.g., a keyboard or mouse). These and other input devices may be coupled to the server by one or more interfaces 1038, such as a serial port interface, parallel port, or universal serial bus (USB). The computing device 1000 may further include a display 1022, such as a touch screen display. The computing device 1000 may be communicatively coupled to actuators, perhaps acting as a controller 1099, or the computing device 1000 may further include a controller 1099. The controller 1099 may be a general satellite body controller or an actuator controller. Actuation control may be entirely effectuated by the central controller 1099 (e.g., a computing system) in the satellite body. In another implementation, control may be by controllers 1099 integrated into or otherwise substantially adjacent to the actuators. The controllers 1099 may follow a master-slave model in which one or more controllers 1099 are masters and the other controllers 1099 are slaves. Alternatively or additionally, control may be distributed among the controllers 1099 (e.g., by swarm or voting control methods). Power for the controllers 1099 and/or actuators may be provided by a power source (e.g., power supply 1016) on the satellite body to the controller via wireless transmission or physical electronic coupling (e.g., the physical electronic coupling running inside of, adjacent to, or coupled to support structures). Alternatively, the controllers 1099 may include independent power sources (e.g., solar panels). Control protocols may be elements of a controller module stored in memory 1004 in one or more of an actuator controller 1099 or a general controller 1099.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example deployable electromagnetic radiation antenna system for extraterrestrial deployment is provided. The deployable electromagnetic radiation antenna system includes one or more deployable support structures, an electromagnetic radiation directing surface, a plurality of actuators, each coupled to one or more of the one or more deployable support structures and the electromagnetic radiation directing surface, and a satellite body, wherein the electromagnetic radiation directing surface is coupled to the satellite body by the one or more deployable support structures and the electromagnetic radiation directing surface is deployable from the satellite body by the one or more deployable support structures.

Another example deployable electromagnetic radiation antenna system of any prior system is provided, wherein the satellite body includes an antenna feed configured to communicate a beam of electromagnetic radiation in a first direction.

Another example deployable electromagnetic radiation antenna system of any prior system is provided, wherein the electromagnetic radiation directing surface is positioned in the first direction from the satellite body and the electromagnetic radiation directing surface is configured to receive the beam of electromagnetic radiation from the first direction and emit a resulting phase-shifted beam of electromagnetic radiation in a second direction different from the first direction.

Another example deployable electromagnetic radiation antenna system of any prior system is provided, wherein the electromagnetic radiation directing surface is an electromagnetic radiation lens configured to receive the beam of electromagnetic radiation from the first direction and pass a resulting phase-shifted beam of electromagnetic radiation through the electromagnetic radiation directing surface in a different second direction.

Another example deployable electromagnetic radiation antenna system of any prior system is provided, wherein the electromagnetic radiation directing surface is an electromagnetic radiation reflector configured to receive the beam of electromagnetic radiation from the first direction and reflect a resulting phase-shifted beam of electromagnetic radiation from the electromagnetic radiation directing surface in a different second direction.

Another example deployable electromagnetic radiation antenna system of any prior system is provided, wherein couplings between the satellite body and the one or more deployable support structures are at proximal ends of the one or more deployable support structures and each of one or more of the plurality of actuators is coupled adjacent to a distal end of at least one of the one or more deployable support structures.

Another example deployable electromagnetic radiation antenna system of any prior system is provided, wherein the deployable electromagnetic radiation antenna system deploys by extending distal portions of the one or more deployable support structures away from the satellite body and the plurality of actuators is coupled to the distal portions.

Another example deployable electromagnetic radiation antenna system of any prior system is provided, wherein the deployable electromagnetic radiation antenna system deploys by extending portions of the one or more deployable support structures coupled to the actuators distally from the satellite body.

Another example deployable electromagnetic radiation antenna system of any prior system is provided, wherein a coupling of each of the plurality of actuators and at least one of the one or more deployable support structures is closer to a coupling between the one or more deployable support structures and the electromagnetic radiation directing surface than a coupling between the one or more deployable support structures and the satellite body when the deployable electromagnetic radiation antenna system is in a deployed state.

Another example deployable electromagnetic radiation antenna system of any prior system further includes a rotatable coupling between the one or more deployable support structures and the satellite body, wherein the rotatable coupling facilitates rotation of the electromagnetic radiation directing surface relative to the satellite body.

Another example deployable electromagnetic radiation antenna system of any prior system is provided, wherein the rotatable coupling has an axis of rotation and the plurality of actuators are adapted to rotate the electromagnetic radiation directing surface about the axis of rotation.

Another example deployable electromagnetic radiation antenna system of any prior system is provided, wherein the axis of rotation is coincident with one or more of a central axis of the electromagnetic radiation directing surface, a central axis of the satellite body, and an axis defined by a beam of electromagnetic radiation emitted by an antenna feed of the antenna body.

Another example deployable electromagnetic radiation antenna system of any prior system is provided, wherein the deployable electromagnetic radiation antenna system is configured to transition from an undeployed state to a deployed state, wherein the transition from the undeployed state to the deployed state includes extending elements of the one or more deployable support structures to which the plurality of actuators are coupled away from the satellite body and wherein the extending causes the electromagnetic radiation directing surface to unfurl.

Another example deployable electromagnetic radiation antenna system of any prior system is provided, wherein the plurality of actuators is closer to the electromagnetic radiation directing surface than the satellite body in the deployed state.

Another example deployable electromagnetic radiation antenna system of any prior system further includes an actuator controller communicatively coupled to the plurality of actuators, wherein the actuator controller operatively controls motion actuated by the plurality of actuators.

Another example deployable electromagnetic radiation antenna system of any prior system is provided, wherein one or more of the plurality of actuators include an actuator controller to control motion actuated by the plurality of actuators.

Another example deployable electromagnetic radiation antenna system of any prior system is provided, wherein the actuator controller is a master controller relative to other slave controllers communicatively coupled to actuators other than the one or more of the plurality of actuators.

Another example deployable electromagnetic radiation antenna system of any prior system is provided, wherein the actuator controller is one of a plurality of actuator controllers and control of actuated motion by the one or more plurality of actuators is distributed among the plurality of controllers.

Another example deployable electromagnetic radiation antenna system of any prior system is provided, wherein the satellite body further includes a power source, wherein the actuator controller is supplied power by the power source via electronic couplings along at least one of the one or more deployable support structures.

Another example deployable electromagnetic radiation antenna system of any prior system is provided, wherein the actuator controller includes an independent power source, wherein the actuator controller is supplied power by the independent power source independently of power sources that supply power to the satellite body.

Another example deployable electromagnetic radiation antenna system of any prior system is provided, the satellite body further including a general controller to control functions of the satellite body, the general controller communicatively coupled to the actuator controller and a transceiver to transmit data between the general controller of the satellite body and an external computing system, wherein the transceiver is operable to receive actuating instructions and the general controller is operable to transmit the actuating instructions to the actuator controller.

Another example deployable electromagnetic radiation antenna system of any prior system is provided, wherein the plurality of actuators is arranged substantially axisymmetrically about the electromagnetic radiation directing surface.

Another example deployable electromagnetic radiation antenna system of any prior system is provided, wherein the plurality of actuators is configured to modify the orientation of the electromagnetic radiation directing surface by transitioning the deployable electromagnetic radiation antenna system between an orientation in which electromagnetic radiation directing surface is between the satellite body and the target and an orientation in which the satellite body is between the electromagnetic radiation directing surface and the target.

Another example deployable electromagnetic radiation antenna system of any prior system is provided, the antenna body further including an antenna feed configured to emit a beam of electromagnetic radiation, wherein the plurality of actuators is configured to modify the orientation of the electromagnetic radiation directing surface to direct the beam of electromagnetic radiation to a position on a target surface.

Another example deployable electromagnetic radiation antenna system of any prior system is provided, wherein the plurality of actuators is configured to modify the orientation of the electromagnetic radiation directing surface by collectively providing substantially axisymmetric motive force about the electromagnetic radiation directing surface.

Another example deployable electromagnetic radiation antenna system of any prior system is provided, wherein the plurality of actuators includes one or more of a thruster, a gyroscope, a reaction wheel, and a magnetic propulsion device.

Another example deployable electromagnetic radiation antenna system of any prior system is provided, wherein the plurality of actuators is configured to modify the orientation of the electromagnetic radiation directing surface by rotating the electromagnetic radiation directing surface without flexing the electromagnetic radiation directing surface.

Another example deployable electromagnetic radiation antenna system of any prior system is provided, wherein the electromagnetic radiation directing surface is configured to phase-shift a beam of electromagnetic radiation, and the plurality of actuators is configured to modify the orientation of the electromagnetic radiation directing surface by rotating the electromagnetic radiation directing surface while substantially maintaining phase-shifting properties of the electromagnetic radiation directing surface.

Another example deployable electromagnetic radiation antenna system of any prior system is provided, wherein the plurality of actuators includes at least one motorized mount that couples at least one of the one or more deployable support structures to the satellite body and is configured to rotate the electromagnetic radiation directing surface relative to the satellite body.

Another example deployable electromagnetic radiation antenna system of any prior system is provided, wherein at least one of the one or more deployable support structures are configured to deploy radially outwardly relative to the electromagnetic radiation directing surface.

Another example deployable electromagnetic radiation antenna system of any prior system is provided, wherein at least one of the one or more deployable support structures are configured to deploy peripherally about the electromagnetic radiation directing surface.

An example method of using a deployable electromagnetic radiation antenna system is provided. The method includes extending one or more deployable support structures coupled to the satellite body from the satellite body, wherein the operation of extending the one or more deployable support structures includes extending an electromagnetic radiation directing surface coupled to the one or more deployable support structures away from the satellite body, unfurling the electromagnetic radiation directing surface, and extending a plurality of actuators coupled to at least one of the one or more deployable support structures away from the satellite body.

Another example method of any preceding method is provided, wherein the operation of extending the plurality of actuators from the satellite body includes extending the actuators to be closer to the electromagnetic radiation directing surface than the satellite body.

Another example method of any preceding method further includes modifying, by the plurality of actuators, the orientation of the electromagnetic radiation directing surface relative to one or more of the satellite body and a target.

Another example method of any preceding method is provided, wherein the operation of modifying includes transitioning the deployable electromagnetic radiation antenna system between an orientation in which electromagnetic radiation directing surface is between satellite body and the target and an orientation in which the satellite body is between the electromagnetic radiation directing surface and the target.

Another example method of any preceding method includes emitting, from an antenna feed of the satellite body, a beam of electromagnetic radiation in a first direction to the electromagnetic radiation directing surface, phase-shifting, in the electromagnetic radiation directing surface, the beam of electromagnetic radiation to generate a resulting phase-shifted beam of electromagnetic radiation, and emitting, by the electromagnetic radiation directing surface, the resulting phase-shifted beam of electromagnetic radiation in a second direction different from the first direction.

Another example method of any preceding method further includes receiving, at a transceiver of the satellite body, instructions for modifying the orientation of the electromagnetic radiation directing surface, using the plurality of actuators, transmitting, from the satellite body to a controller of the plurality of actuators, the instructions, and modifying, by the plurality of actuators, the orientation of the electromagnetic radiation directing surface based at least in part on the instructions.

An example deployable electromagnetic radiation antenna system for extraterrestrial deployment is disclosed. The deployable electromagnetic radiation antenna system includes an electromagnetic radiation directing surface, one or more deployable support structures, each deployable support structure having a first end coupled to the electromagnetic radiation directing surface, and a plurality of deployment mechanism nodes, each coupled to a second end of a corresponding support structure of the one or more deployable support structures and configured to deploy at least one of the one or more deployable support structures away from a corresponding deployment mechanism node to form at least one substantially planar surface in the electromagnetic radiation directing surface.

Another example deployable electromagnetic radiation antenna system of any preceding system is provided, wherein one or more of the plurality of deployment mechanism nodes includes one or more actuators configured to actuate movement of the deployed electromagnetic radiation directing surface.

Another example deployable electromagnetic radiation antenna system of any preceding system further includes a plurality of passive nodes, each coupled to a second of a different corresponding support structure of the one or more deployable support structures, wherein the passive nodes do not have active mechanisms for deploying the one or more deployable structures.

Another example deployable electromagnetic radiation antenna system of any preceding system is provided, wherein the arrangement of the plurality of deployment mechanism nodes and the plurality of passive nodes is axisymmetric about the electromagnetic radiation directing surface.

Another example deployable electromagnetic radiation antenna system of any preceding system is provided, wherein the arrangement of the plurality of deployment mechanism nodes and the plurality of passive nodes is staggered about a periphery of the electromagnetic radiation directing surface.

Another example deployable electromagnetic radiation antenna system of any preceding system is provided, wherein each of the plurality of deployment mechanism nodes receives an end of a support structure of the one or more deployment structures deployed from one of the plurality of deployment mechanism nodes and deploy with deployment mechanisms the at least one of the one or more deployable support structures to a different one of the plurality of deployment mechanism nodes.

Another example deployable electromagnetic radiation antenna system of any preceding system is provided, wherein each of the plurality of deployment mechanism nodes is configured to deploy, by one or more deployment mechanisms, more than one of the one or more deployable support structures.

Another example deployable electromagnetic radiation antenna system of any preceding system is provided, wherein a first of the plurality of deployment mechanism nodes is configured to deploy a second of the plurality of deployment mechanism nodes away from the first of the plurality of deployment mechanism nodes by deploying at least one of the one or more deployable support structures.

Another example deployable electromagnetic radiation antenna system of any preceding system is provided further includes a satellite body to which one or more of the plurality of deployment mechanism nodes is statically attached.

Another example deployable electromagnetic radiation antenna system of any preceding system is provided, wherein at least one of the one or more deployable support structures are configured to deploy radially inwardly relative to the electromagnetic radiation directing surface.

Another example deployable electromagnetic radiation antenna system of any preceding system is provided, wherein at least one of the one or more deployable support structures are configured to deploy peripherally about the electromagnetic radiation directing surface.

An example system of using a deployable electromagnetic radiation antenna system is provided. The system includes means for extending one or more deployable support structures coupled to the satellite body from the satellite body, wherein extension of the one or more deployable support structures includes extension of an electromagnetic radiation directing surface coupled to the one or more deployable support structures away from the satellite body, means for unfurling the electromagnetic radiation directing surface, and means for extending a plurality of actuators coupled to at least one of the one or more deployable support structures away from the satellite body.

Another example system of any preceding system is provided, wherein the extension of the plurality of actuators from the satellite body includes extension of the actuators to be closer to the electromagnetic radiation directing surface than the satellite body.

Another example system of any preceding system further includes means for modifying, by the plurality of actuators, the orientation of the electromagnetic radiation directing surface relative to one or more of the satellite body and a target.

Another example system of any preceding system is provided, wherein the means for modifying includes means for transitioning of the deployable electromagnetic radiation antenna system between an orientation in which electromagnetic radiation directing surface is between satellite body and the target and an orientation in which the satellite body is between the electromagnetic radiation directing surface and the target.

Another example system of any preceding system includes means for emitting, from an antenna feed of the satellite body, a beam of electromagnetic radiation in a first direction to the electromagnetic radiation directing surface, means for phase-shifting, in the electromagnetic radiation directing surface, the beam of electromagnetic radiation to generate a resulting phase-shifted beam of electromagnetic radiation, and means for emitting, by the electromagnetic radiation directing surface, the resulting phase-shifted beam of electromagnetic radiation in a second direction different from the first direction.

Another example system of any preceding system further includes means for receiving, at a transceiver of the satellite body, instructions for modifying the orientation of the electromagnetic radiation directing surface, using the plurality of actuators, means for transmitting, from the satellite body to a controller of the plurality of actuators, the instructions, and means for modifying, by the plurality of actuators, the orientation of the electromagnetic radiation directing surface based at least in part on the instructions.

While this specification contains many specific implementation details, these should not be construed as limitations on the scope of any inventions or of what may be claimed, but rather as descriptions of features specific to particular implementations of a particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

A number of implementations of the described technology have been disclosed. Nevertheless, it will be understood that various modifications can be made without departing from the spirit and scope of the recited claims.

What is claimed is:

1. A deployable electromagnetic radiation antenna system for extraterrestrial deployment, comprising:
   one or more deployable support structures configured to increase in length;
   an electromagnetic radiation directing surface;
   a plurality of actuators, each coupled to the one or more deployable support structures or the electromagnetic radiation directing surface; and
   a satellite body, wherein the electromagnetic radiation directing surface is coupled to the satellite body by the one or more deployable support structures and the electromagnetic radiation directing surface is adapted to be expanded by and is deployable from the satellite body by the increase in length of the one or more deployable support structures,
   wherein the plurality of actuators is configured to modify an orientation of the deployable electromagnetic radiation antenna system relative to a target external to the deployable electromagnetic radiation antenna system.

2. The deployable electromagnetic radiation antenna system of claim 1, wherein the satellite body includes an antenna feed configured to communicate a beam of electromagnetic radiation in a first direction.

3. The deployable electromagnetic radiation antenna system of claim 2, wherein the electromagnetic radiation directing surface is positioned in the first direction from the satellite body and the electromagnetic radiation directing surface is configured to receive the beam of electromagnetic radiation from the first direction and emit a resulting phase-shifted beam of electromagnetic radiation in a second direction different from the first direction.

4. The deployable electromagnetic radiation antenna system of claim 2, wherein the electromagnetic radiation directing surface is an electromagnetic radiation lens configured to receive the beam of electromagnetic radiation from the first direction and pass a resulting phase-shifted beam of electromagnetic radiation through the electromagnetic radiation directing surface in a different second direction.

5. The deployable electromagnetic radiation antenna system of claim 2, wherein the electromagnetic radiation directing surface is an electromagnetic radiation reflector configured to receive the beam of electromagnetic radiation from the first direction and reflect a resulting phase-shifted beam of electromagnetic radiation from the electromagnetic radiation directing surface in a different second direction.

6. The deployable electromagnetic radiation antenna system of claim 1, wherein couplings between the satellite body and the one or more deployable support structures are at proximal ends of the one or more deployable support structures and each of one or more of the plurality of actuators is coupled adjacent to a distal end of at least one of the one or more deployable support structures.

7. The deployable electromagnetic radiation antenna system of claim 1, wherein the deployable electromagnetic radiation antenna system deploys by extending distal portions of the one or more deployable support structures away from the satellite body and the plurality of actuators is coupled to the distal portions.

8. The deployable electromagnetic radiation antenna system of claim 1, wherein the deployable electromagnetic radiation antenna system deploys by extending portions of the one or more deployable support structures coupled to the plurality of actuators distally from the satellite body.

9. The deployable electromagnetic radiation antenna system or claim 1, wherein a coupling of each of the plurality of actuators and at least one of the one or more deployable support structures is closer to a coupling between the one or more deployable support structures and the electromagnetic radiation directing surface than a coupling between the one or more deployable support structures and the satellite body when the deployable electromagnetic radiation antenna system is in a deployed state.

10. The deployable electromagnetic radiation antenna system of claim 1, further comprising:
a rotatable coupling between the one or more deployable support structures and the satellite body, wherein the rotatable coupling facilitates rotation of the electromagnetic radiation directing surface relative to the satellite body.

11. The deployable electromagnetic radiation antenna system of claim 10, wherein the rotatable coupling has an axis of rotation and the plurality of actuators are adapted to rotate the electromagnetic radiation directing surface about the axis of rotation.

12. The deployable electromagnetic radiation antenna system of claim 11, wherein the axis of rotation is coincident with one or more of a central axis of the electromagnetic radiation directing surface, a central axis of the satellite body, and an axis defined by a beam of electromagnetic radiation emitted by an antenna feed of the satellite body.

13. The deployable electromagnetic radiation antenna system of claim 1, wherein the deployable electromagnetic radiation antenna system is configured to transition from an undeployed state to a deployed state, wherein the transition from the undeployed state to the deployed state includes extending elements of the one or more deployable support structures to which the plurality of actuators are coupled away from the satellite body and wherein the extending causes the electromagnetic radiation directing surface to unfurl.

14. The deployable electromagnetic radiation antenna system of claim 13, wherein the plurality of actuators is closer to the electromagnetic radiation directing surface than the satellite body in the deployed state.

15. The deployable electromagnetic radiation antenna system of claim 1, the satellite body further comprising:
an actuator controller communicatively coupled to the plurality of actuators, wherein the actuator controller operatively controls motion actuated by the plurality of actuators.

16. The deployable electromagnetic radiation antenna system of claim 1, wherein one or more of the plurality of actuators include an actuator controller to control motion actuated by the plurality of actuators.

17. The deployable electromagnetic radiation antenna system of claim 16, wherein the actuator controller is a master controller relative to other slave controllers communicatively coupled to actuators other than the one or more of the plurality of actuators.

18. The deployable electromagnetic radiation antenna system of claim 16, wherein the actuator controller is one of a plurality of actuator controllers and control of actuated motion by the one or more of the plurality of actuators is distributed among the plurality of controllers.

19. The deployable electromagnetic radiation antenna system of claim 16, wherein the satellite body further comprises:
a power source, wherein the actuator controller is supplied power by the power source via electronic couplings along at least one of the one or more deployable support structures.

20. The deployable electromagnetic radiation antenna system of claim 16, wherein the actuator controller comprises:
an independent power source, wherein the actuator controller is supplied power by the independent power source independently of power sources that supply power to the satellite body.

21. The deployable electromagnetic radiation antenna system of claim 16, the satellite body further comprising:
a general controller to control functions of the satellite body, the general controller communicatively coupled to the actuator controller; and
a transceiver to transmit data between the general controller of the satellite body and an external computing system, wherein the transceiver is operable to receive actuating instructions and the general controller is operable to transmit the actuating instructions to the actuator controller.

22. The deployable electromagnetic radiation antenna system of claim 1, wherein the plurality of actuators is arranged substantially axisymmetrically about the electromagnetic radiation directing surface.

23. The deployable electromagnetic radiation antenna system of claim 1, wherein the plurality of actuators is configured to modify the orientation of the deployable electromagnetic radiation antenna system relative to the target by transitioning the deployable electromagnetic radiation antenna system between an orientation in which electromagnetic radiation directing surface is between the satellite body and the target and an orientation in which the satellite body is between the electromagnetic radiation directing surface and the target.

24. The deployable electromagnetic radiation antenna system of claim 1, the satellite body further comprising:
an antenna feed configured to emit a beam of electromagnetic radiation, wherein the plurality of actuators is configured to modify the orientation of the deployable electromagnetic radiation antenna system relative to the target to direct the beam of electromagnetic radiation to a position on a target surface.

25. The deployable electromagnetic radiation antenna system of claim 1, wherein the plurality of actuators is configured to modify the orientation of the deployable electromagnetic radiation antenna system relative to the target by collectively providing substantially axisymmetric motive force about the electromagnetic radiation directing surface.

26. The deployable electromagnetic radiation antenna system of claim 1, wherein the plurality of actuators includes one or more of a thruster, a gyroscope, a reaction wheel, and a magnetic propulsion device.

27. The deployable electromagnetic radiation antenna system of claim 1, wherein the plurality of actuators is configured to modify the orientation of the deployable electromagnetic radiation antenna system relative to the target by rotating the deployable electromagnetic radiation antenna system without flexing the electromagnetic radiation directing surface.

28. The deployable electromagnetic radiation antenna system of claim 1, wherein the electromagnetic radiation directing surface is configured to phase-shift a beam of electromagnetic radiation and the plurality of actuators is configured to modify the orientation of the deployable electromagnetic radiation antenna system relative to the target by rotating the deployable electromagnetic radiation antenna system while substantially maintaining phase-shifting properties of the electromagnetic radiation directing surface.

29. The deployable electromagnetic radiation antenna system of claim 1, wherein the plurality of actuators includes at least one motorized mount that couples at least one of the one or more deployable support structures to the satellite body and is configured to rotate the electromagnetic radiation directing surface relative to the satellite body.

30. The deployable electromagnetic radiation antenna system of claim 1, wherein at least one of the one or more deployable support structures are configured to deploy radially outwardly relative to the electromagnetic radiation directing surface.

31. The deployable electromagnetic radiation antenna system of claim 1, wherein at least one of the one or more deployable support structures are configured to deploy peripherally about the electromagnetic radiation directing surface.

32. A method of using a deployable electromagnetic radiation antenna system, comprising:
   extending one or more deployable support structures coupled to a satellite body from the satellite body, wherein the operation of extending the one or more deployable support structures includes:
      increasing the one or more deployable support structures in length away from the satellite body;
      extending, by the operation of increasing, an electromagnetic radiation directing surface coupled to the one or more deployable support structures away from the satellite body, wherein the operation of extending deploys the electromagnetic radiation directing surface from the satellite body, and the electromagnetic radiation directing surface is coupled to the satellite body by the one or more deployable support structures;
      expanding, by the operation of increasing, the electromagnetic radiation directing surface; and
      extending, by the operation of increasing, a plurality of actuators coupled to at least one of the one or more deployable support structures away from the satellite body,
   wherein the plurality of actuators is configured to modify an orientation of the deployable electromagnetic radiation antenna system relative to a target external to the deployable electromagnetic radiation antenna system.

33. The method of claim 32, wherein the operation of extending the plurality of actuators from the satellite body includes extending the plurality of actuators to be closer to the electromagnetic radiation directing surface than the satellite body.

34. The method of claim 32, further comprising:
   modifying, by the plurality of actuators, an orientation of the electromagnetic radiation directing surface relative to the satellite body.

35. The method of claim 34, further comprising:
   modifying the orientation of the deployable electromagnetic radiation antenna system relative to the target by transitioning the deployable electromagnetic radiation antenna system between an orientation in which electromagnetic radiation directing surface is between satellite body and the target and an orientation in which the satellite body is between the electromagnetic radiation directing surface and the target.

36. The method of claim 32, further comprising:
   emitting, from an antenna feed of the satellite body, a beam of electromagnetic radiation in a first direction to the electromagnetic radiation directing surface;
   phase-shifting, in the electromagnetic radiation directing surface, the beam of electromagnetic radiation to generate a resulting phase-shifted beam of electromagnetic radiation; and
   emitting, by the electromagnetic radiation directing surface, the resulting phase-shifted beam of electromagnetic radiation in a second direction different from the first direction.

37. The method of claim 32, further comprising:
   receiving, at a transceiver of the satellite body, instructions for modifying the orientation of the deployable electromagnetic radiation antenna system relative to the target, using the plurality of actuators;
   transmitting, from the satellite body to a controller of the plurality of actuators, the instructions; and
   modifying, by the plurality of actuators, the orientation of the electromagnetic radiation directing surface based at least in part on the instructions.

38. A deployable electromagnetic radiation antenna system for extraterrestrial deployment, comprising:
   an electromagnetic radiation directing surface;
   one or more deployable support structures, each deployable support structure having a first end coupled to the electromagnetic radiation directing surface;
   a plurality of deployment mechanism nodes, each coupled to a second end of a corresponding support structure of the one or more deployable support structures and configured to deploy at least one of the one or more deployable support structures away from a corresponding deployment mechanism node by increasing the one or more deployable support structures in length to form at least one substantially planar surface in the electromagnetic radiation directing surface; and
   a plurality of actuators, each coupled to at least one of the plurality of deployment mechanism nodes, the plurality of actuators configured to modify an orientation of the deployable electromagnetic radiation antenna system relative to a target external to the deployable electromagnetic radiation antenna system.

39. The deployable electromagnetic radiation antenna system of claim 38, wherein deployment of the plurality of deployment mechanism nodes deploys the electromagnetic radiation directing surface and one or more of the plurality of deployment mechanism nodes includes one or more actuators configured to actuate movement of the deployed electromagnetic radiation directing surface.

40. The deployable electromagnetic radiation antenna system of claim 38, further comprising:
a plurality of passive nodes, each coupled to a second of a different corresponding support structure of the one or more deployable support structures, wherein the plurality of passive nodes does not have active mechanisms for deploying the one or more deployable support structures.

41. The deployable electromagnetic radiation antenna system of claim 40, wherein an arrangement of the plurality of deployment mechanism nodes and the plurality of passive nodes is axisymmetric about the electromagnetic radiation directing surface.

42. The deployable electromagnetic radiation antenna system of claim 40, wherein an arrangement of the plurality of deployment mechanism nodes and the plurality of passive nodes is staggered about a periphery of the electromagnetic radiation directing surface.

43. The deployable electromagnetic radiation antenna system of claim 38, wherein each of the plurality of deployment mechanism nodes receives an end of a support structure of the one or more deployable support structures deployed from one of the plurality of deployment mechanism nodes and deploy with deployment mechanisms the at least one of the one or more deployable support structures to a different one of the plurality of deployment mechanism nodes.

44. The deployable electromagnetic radiation antenna system of claim 38, wherein each of the plurality of deployment mechanism nodes is configured to deploy, by one or more deployment mechanisms, more than one of the one or more deployable support structures.

45. The deployable electromagnetic radiation antenna system of claim 38, wherein a first of the plurality of deployment mechanism nodes is configured to deploy a second of the plurality of deployment mechanism nodes away from the first of the plurality of deployment mechanism nodes by deploying at least one of the one or more deployable support structures.

46. The deployable electromagnetic radiation antenna system of claim 38, further comprising:
a satellite body to which one or more of the plurality of deployment mechanism nodes is statically attached.

47. The deployable electromagnetic radiation antenna system of claim 38, wherein at least one of the one or more deployable support structures are configured to deploy radially inwardly relative to the electromagnetic radiation directing surface.

48. The deployable electromagnetic radiation antenna system of claim 38, wherein at least one of the one or more deployable support structures are configured to deploy peripherally about the electromagnetic radiation directing surface.

* * * * *